United States Patent
Rehmatullah et al.

(10) Patent No.: US 12,545,441 B2
(45) Date of Patent: Feb. 10, 2026

(54) THERMAL RADIATOR SHUTTER AND SYSTEM AND METHOD FOR THERMAL CONTROL USING A THERMAL RADIATOR SHUTTER

(71) Applicant: MacDonald, Dettwiler and Associates Inc., Brampton (CA)

(72) Inventors: Faizan Rehmatullah, Etobicoke (CA); Stefanos Dermenakis, Toronto (CA)

(73) Assignee: MacDonald, Dettwiler and Associates Inc., Brampton (CA)

( * ) Notice: Subject to any disclaimer, the term of this patent is extended or adjusted under 35 U.S.C. 154(b) by 96 days.

(21) Appl. No.: 18/640,743

(22) Filed: Apr. 19, 2024

(65) Prior Publication Data

US 2024/0384947 A1    Nov. 21, 2024

Related U.S. Application Data

(60) Provisional application No. 63/502,539, filed on May 16, 2023.

(51) Int. Cl.
| | | |
|---|---|---|
| *B64G 1/50* | (2006.01) | |
| *B64G 1/16* | (2006.01) | |
| *F28F 13/00* | (2006.01) | |

(52) U.S. Cl.
CPC ............... *B64G 1/503* (2013.01); *B64G 1/16* (2013.01); *F28F 2013/008* (2013.01);
(Continued)

(58) Field of Classification Search
CPC .... B64G 1/503; B64G 1/50; F28F 5/00; F28F 2280/10; F28F 2280/105
See application file for complete search history.

(56) References Cited

U.S. PATENT DOCUMENTS

| | | | | |
|---|---|---|---|---|
| 6,080,962 A | * | 6/2000 | Lee ........................ | B64G 1/10 165/41 |
| 6,220,548 B1 | * | 4/2001 | Hyman ................... | B64G 1/58 244/172.6 |

(Continued)

OTHER PUBLICATIONS

Della Torre A et al: "AMALIA Mission Lunar Rover—The conceptual design of the Team ITALIA Rover, candidate for the Google Lunar X Prize Challenge", Acta Astronautica, Pergamon Press, Elmsford, GB, vol. 67, No. 7-8, Oct. 1, 2010 (Oct. 1, 2010), pp. 961-978, XP027218161, ISSN: 0094-5765 [retrieved on Jul. 1, 2010] * the whole document *.

(Continued)

*Primary Examiner* — Gerald L Sung
(74) *Attorney, Agent, or Firm* — Own Innovation; Kent C. Howe; James W. Hinton

(57) ABSTRACT

A thermal radiator shutter and methods of providing thermal control by and manufacturing a thermal radiator shutter are provided. The thermal radiator shutter includes a first baseplate, a second baseplate that is moveable between an open and closed position, and an actuator for moving the second baseplate. When the second baseplate is in the closed position a radiator on the second baseplate faces a radiator on the first baseplate to provide radiative coupling and heat flow between the baseplates. When the second baseplate is in the open position, the respective radiators have a greater view factor to the surrounding environment than in the closed position and a reduced view factor to each other compared to the closed position. The respective radiators reject heat from temperature-controlled components on the first and second baseplates when the second baseplate is in the open position.

20 Claims, 16 Drawing Sheets

(52) U.S. Cl.
CPC ....... *F28F 2245/06* (2013.01); *F28F 2270/00* (2013.01); *F28F 2280/10* (2013.01)

(56) References Cited

U.S. PATENT DOCUMENTS

| | | | |
|---|---|---|---|
| 2007/0221787 A1* | 9/2007 | McKinnon | B64G 1/2222 |
| | | | 244/171.8 |
| 2008/0257525 A1 | 10/2008 | Ohnishi et al. | |
| 2011/0260007 A1 | 10/2011 | Adachi | |
| 2013/0200221 A1* | 8/2013 | Goodzeit | B64G 1/506 |
| | | | 29/890.03 |
| 2022/0073217 A1* | 3/2022 | Iverson | B64G 1/2224 |

OTHER PUBLICATIONS

Extended European Search Report issued in respect of European Patent Application No. 24171582.0 on Oct. 11, 2024.
Hosei Nagano et al: "Development of a lightweight deployable/stowable radiator for interplanetary exploration", Applied Thermal Engineering, Pergamon, Oxford, GB, vol. 31, No. 16, Jun. 7, 2011 (Jun. 7, 2011), pp. 3322-3331, XP028270425, ISSN: 1359-4311, DOI: 10.1016/J.APPLTHERMALENG.2011.06.012 [retrieved on Jun. 17, 2011] * whole document *.

* cited by examiner

THERMAL RADIATOR SHUTTER AND SYSTEM AND METHOD FOR THERMAL CONTROL USING A THERMAL RADIATOR SHUTTER

TECHNICAL FIELD

The following relates generally to thermal control devices, and more particularly to thermal control devices for use in environments with temperature extremes such as space environments, e.g., visiting asteroids, and planetary environments including the Moon and Mars.

INTRODUCTION

Thermal control systems are used to maintain temperatures within a range required for components, such as electronics, to function properly. Thermal control systems must cope with the external environment, which can, in some applications such as space applications, vary in a wide range as systems (e.g., spacecraft, rovers, landers) are exposed to extreme coldness due to the nature of outer space or to intense heat found in the unfiltered direct sunlight of outer space. Thermal control systems must also moderate and manage internal heat generated by operation of system components. Thermal control is critical to guarantee optimal performance and success of a mission because, if a component is subjected to temperatures that are too high or too low, the component could be damaged, or its performance could be severely affected. Thermal control is also necessary to keep specific components (such as sensors, electronics, batteries, etc.) within a specified temperature stability requirement, to ensure that they perform as efficiently as possible.

Outer space environments, such as the lunar surface, can present particular challenges for thermal control. For example, the lunar environment faces extremes of temperature between hot lunar day and cold lunar night that lasts up to 354 hours. Lunar night survival can require surviving extremely low temperatures, e.g., ground temperatures of 40-60 Kelvin, facing and exchanging heat with deep space at 4 Kelvin during the lunar night. Lunar day survival can require surviving extremely high temperatures, e.g., ground temperatures of 400 Kelvin. The lunar night lasts up to 354 hours during which time the night portion of the lunar surface remains dark. The lunar day lasts up to 354 hours during which time the day portion of the lunar surface is heated by the sun. The lengthy day-night cycles of the lunar surface present a unique design space for lunar systems often not encountered in the field of engineering and subfields thereof.

Approaches to thermal control in extreme space and lunar environments, including night survival, include the use of radioactive heating elements or sophisticated active thermal control systems such as pumped fluid loops (e.g., Curiosity, Mars 2020). Such approaches can increase cost, mass, and/or complexity of systems and thus may not be suitable or desired for certain missions or applications (e.g., on a low-cost, low-mass micro-rover platform). Systems using radioactive materials run a further risk to ground systems and crew of radiation leakage or exposure in the event of a failure on a launch pad.

Accordingly, systems, methods, and devices for thermal control are desired that can function in environments with extreme temperature fluctuations and long day/night cycles, such as the lunar surface, without the use of radioactive heating elements or sophisticated thermal control systems.

Furthermore, in some cases, a system such as a rover may include components housed in the same compartment (e.g., a main body or electronics box of a rover) that have different minimum allowable temperatures. It may be desired to create multiple thermal zones in the compartment.

Accordingly, there is a need for improved systems, methods, and devices for thermal control, particularly in environments with temperature extremes such as planetary and other outer space environments, that overcome at least some of the disadvantages of existing systems, methods, and devices.

SUMMARY

A thermal radiator shutter for active thermal control of a system is provided. The thermal radiator shutter includes: a first baseplate having a first temperature-controlled component mounted on a bottom side of the first baseplate and a first radiator disposed on a top side of the first baseplate; a second baseplate having a second temperature-controlled component mounted on a first side of the second baseplate and a second radiator disposed on a second side of the second baseplate opposing the first side, the second baseplate being moveable between a closed position and an open position; and an actuator connected to the second baseplate for moving the second baseplate from the closed position to the open position and from the open position to the closed position. When the second baseplate is in the closed position the second radiator faces the first radiator to provide radiative coupling, creating a thermal loop where heat flows between the first and second baseplates. When the second baseplate is in the open position the first and second baseplates are separated such that (i) the first and second radiators have a greater view factor to a surrounding environment than in the closed position for rejecting heat from the first and second temperature-controlled components, respectively, and (ii) the first and second radiators have a reduced view factor to each other compared to the closed position.

When the second baseplate is in the closed position each of the first and second radiators may have a 0% view factor to the surrounding environment.

When the second baseplate is in the closed position the first and second radiators may be in full thermal communication with each other.

When the second baseplate is in the closed position the first and second radiators may not make physical contact with each other, and the system may further comprise an insulative material covering an edge where the first and second radiators come together to reduce heat leakage from the edge.

The thermal radiator shutter may further comprise an insulative material applied to each surface of the first and second baseplates that is exposed to the surrounding environment when the second baseplate is in either the open or closed position.

The first and second radiators may have first and second radiative surfaces, respectively, that are equal in size.

The first and second radiators may have respective sizes and geometries that allow them to act as radiators when the second baseplate is in the open position and act as view blockers to the other radiator when the second baseplate is in the closed position. The first and second radiators may have view factors of at least 80% to space when the second baseplate is in the open position, and view factors of at most 20% to space when the second baseplate is in the closed position.

At least one of the first radiator and the second radiator may be a separate piece of material from the first or second baseplate, respectively.

The first baseplate may be covered in an insulative material and the first radiator may be a portion of the first baseplate that is not covered by the insulative material. The second baseplate may be covered in an insulative material and the second radiator may be a portion of the first baseplate that is not covered by the insulative material.

The first radiator or the second radiator may be coated with an optical coating having a absorptance-to-emittance ratio in the range of 0.1 to 0.3.

The optical coating may be a white paint or a reflective tape.

The actuator may comprise a hinge mechanism, and the second baseplate may be between the open and closed positions via the hinge mechanism.

The movement of the second baseplate from the open position to the closed position or from the closed position to the open position may be performed automatically based on detection of an environmental condition of the surrounding environment.

The thermal radiator shutter may further comprise a third temperature-controlled component mounted to the first side of the first baseplate and a heat switch disposed between the third temperature-controlled component and the first side of the first baseplate, the heat switch for regulating or controlling thermal coupling or conductance between the third temperature-controlled component and the first baseplate.

The third temperature-controlled component may be enclosed or covered in a layer of thermal insulation.

The thermal radiator shutter of claim 1, may further comprise: a third baseplate having a third temperature-controlled component mounted on a first side of the third baseplate and a third radiator disposed on a second side of the third baseplate opposing the first side, the third baseplate being moveable between a closed position and an open position: a fourth radiator disposed on the second side of the first baseplate; and a second actuator for moving the third baseplate between the open and closed positions. When the third baseplate is in the open position the first and third baseplates may be separated such that the third and fourth radiators have a greater view factor to a surrounding environment than in the closed position for rejecting heat from the first and third temperature-controlled components, respectively, and the third and fourth radiators have a reduced view factor to each other compared to the closed position.

The thermal radiator shutter may be implemented as part of a robotic system, and the actuator may be an extant actuator system of the robotic system.

The robotic system may be a space rover comprising a mast boom controlled by the extant actuator system, wherein the second baseplate is on the mast boom and the first baseplate is on a platform of the space rover to which the mast boom is connected, and wherein the second baseplate is deployed via the mast boom.

A method of providing thermal control via a thermal radiator shutter is also provided. The method includes: providing a thermal radiator shutter in a closed configuration, the thermal radiator shutter including a first baseplate having a first thermally controlled component on a first side and a first radiator on a second opposing side, and a second baseplate having a second thermally controlled component on a first side and a second radiator on a second opposing side, the second baseplate in a stowed position, the first and second radiators being equal in size; determining to switch the thermal radiator shutter from the closed configuration to an open configuration; in response to the determination to switch the thermal radiator shutter from the closed configuration to an open configuration, putting the thermal radiator shutter in the open configuration by moving the second baseplate from the stowed position to a deployed position to provide planar separation of the first baseplate and the second baseplate such that each of the first radiator and the second radiators have a suitable view factor for emitting or rejecting heat; determining to switch the thermal radiator shutter from the open configuration to the closed configuration; and in response to the determination to switch the thermal radiator shutter from the open configuration to the closed configuration, moving the second baseplate from the deployed position to the stowed position where the first and second radiators face each other and form a closed thermal loop.

A method of manufacturing a thermal radiator shutter for providing active thermal control is also provided. The method includes: mounting a first temperature-controlled component to a first side of a first baseplate, the mounting including thermally coupling the first temperature-controlled component to the first baseplate; disposing a first radiator on a second side of the first baseplate, the second side opposing the first side, the first radiator for rejecting heat generated by the first temperature-controlled component; mounting a second temperature-controlled component to a first side of a second baseplate, the mounting including thermally coupling the second temperature-controlled component to the second baseplate; disposing a second radiator on a second side of the second baseplate, the second side opposing the first side, the second radiator for rejecting heat generated by the second thermally-controlled component, the first and second radiators each having a radiative surface with the same dimensions; and connecting the second baseplate to the first baseplate such that the second baseplate is moveable relative to the first baseplate, the second baseplate being moveable between a first position, in which the second radiator is in planar alignment with the first radiator to provide radiative coupling between the first radiator and the second radiator and eliminate the view factors of the first and second radiators, and a second position, in which the second radiator is separated from the first radiator such that the first and second radiators reject heat generated by the first and second temperature-controlled components, respectively.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1A:
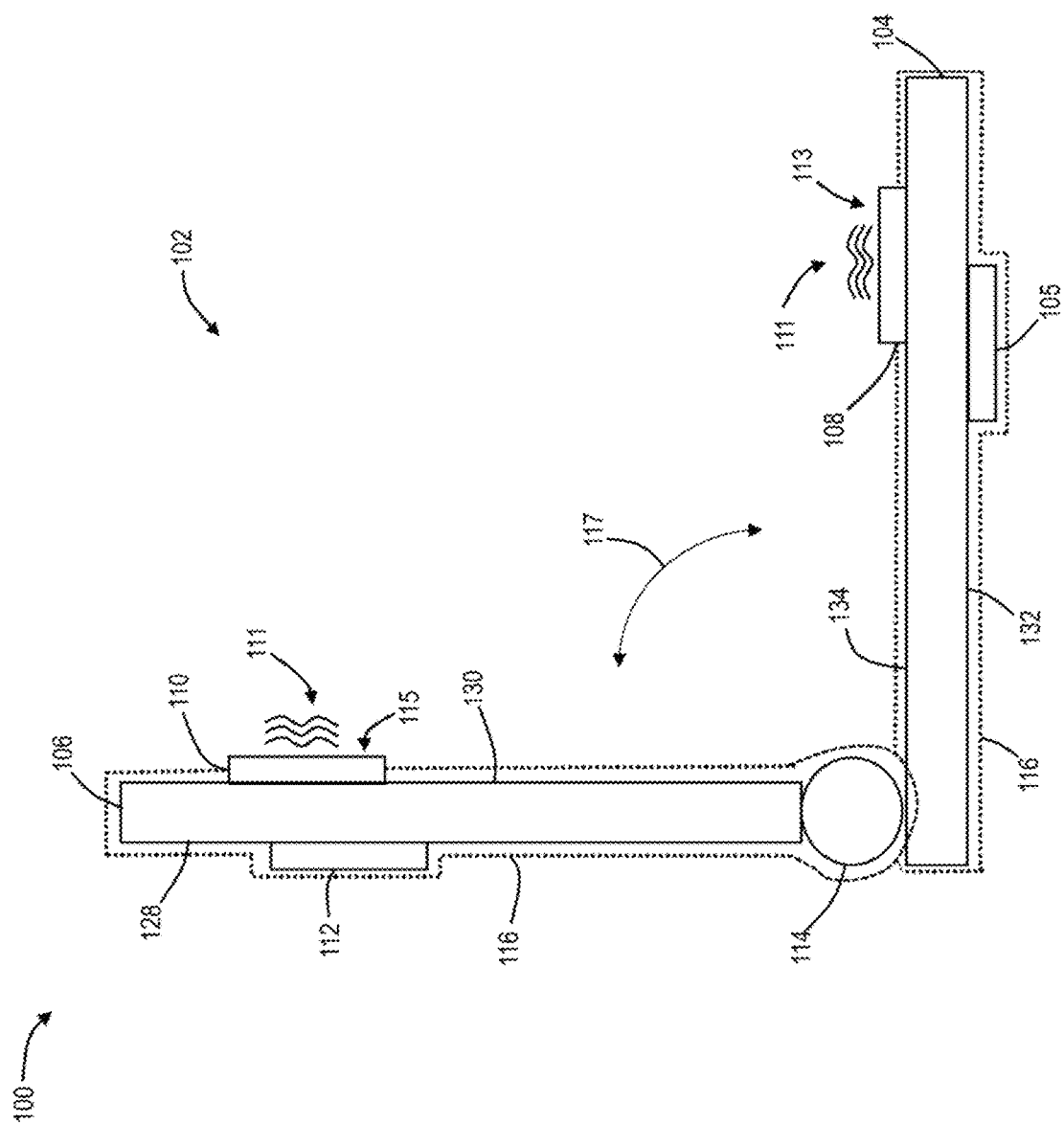
FIG. 1A is a side view schematic diagram of a thermal control system having two baseplates, the thermal control system in an open configuration for dissipating or rejecting heat during space exploration system operation, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Throughout the present disclosure, "planetary" is to be understood as referring to any satellite in outer space, whether a natural satellite such as the Moon, Mars, or an asteroid. Applications of the present disclosure on planetary environments may, in some embodiments, also have similar application on artificial satellites. Throughout the present disclosure, "space" is to be understood as referring to any environment in outer space, including an orbital path about or adjacent to a planetary environment.

The following relates generally to a thermal control device and more particularly to an active thermal control device for use in space-based applications and in environments with temperature extremes (e.g., lunar surface).

A thermal radiator shutter is provided. The thermal radiator shutter is an active thermal control device used to reject or dissipate heat from a spacecraft (e.g., a rover or the like) or other system in an open state and thermally isolate or decouple itself from the environment in a closed state. While much of the present disclosure focuses on embodiments of the thermal radiator shutter with two baseplates ("dual-baseplate shutter"), embodiments with more than two baseplates are expressly contemplated by the present disclosure, such as those described herein. It will be understood that the rejection of heat from the spacecraft may be a passive process in which heat is transmitted away from the spacecraft through a radiator. Such a radiator may be a component specifically manufactured, designed, or used as a radiator. Such a radiator may be a component that is not thermally isolated from the environment (e.g., a portion of a baseplate that is not covered in thermally isolating material, while the rest of the baseplate is). Such a radiator may be a component that is less thermally isolated from the environment than other components that are not radiators, the radiator still being at least partially thermally isolated from the environment (e.g., the radiator may be a portion of the baseplate that has less thermal radiation material than the rest of the baseplate).

In an embodiment, a dual-baseplate shutter of the present disclosure includes first and second baseplates. Each of the first and second baseplates carries components whose temperature is being controlled ("temperature-controlled component(s)"). The temperature-controlled components are mounted on a first side of the respective baseplate and enclosed in an insulating material. A radiator is provided on a second side of the respective baseplate which opposes the first side of the baseplate. The radiator may be a separate piece of material coupled to the baseplate or may be an exposed portion of the second side of the baseplate that is not covered in insulating material (e.g., a cut-out in the insulating material covering the baseplate).

In an embodiment, the radiators on the first and second baseplates are equal in size in order to provide a similar or identical radiative surface area. Such similar or identical radiative surface area allows the radiators to radiatively couple and form a closed thermal loop such that little to no heat escapes from the radiatively-coupled radiators in the closed thermal loop.

In an embodiment, the radiators on the first and second baseplates are different in size but provide a similar or identical radiative surface area.

The radiators may be coated in an optical coating, such as a white paint (e.g., with low absorptance-to-emittance ratio) or flexible reflective tape, to minimize or reduce absorption of solar fluxes and maximize or increase emitted heat capability. Properties of the optical coating such as absorptivity and emissivity may vary based on wavelength dependent effects and changes from beginning of life ("BOL") to end of life ("EOL"). Generally, the optical coating may have high infrared ("IR") emissivity and low solar absorptivity, which allows the surface to reject heat in the infrared range and yet not absorb energy from sunlight (shorter wavelengths on average). In an embodiment, the absorptivity and emissivity are selected from respective ranges suitable for passive thermal control. In an embodiment, the absorptivity may be in the range of 0.1 to 0.2+/−0.05. In an embodiment, the emissivity may be in the range of 0.7 to 0.9+/−0.05. In embodiments in which the thermal radiator shutter is used in a lunar environment, dust contamination may change these values and degrade them by ~0.1 (degrading them in the sense of increasing absorptivity and decreasing emissivity and making a poorer radiating surface). In an embodiment, the optical coating may have an absorptivity-to-emissivity ratio in the range of 0.1 to 0.3.

In a fully closed state, the first and second baseplates are brought together such that the two radiators face each other to provide radiative coupling. The closed state, and corresponding positioning of the two radiators, creates a closed thermal loop where the heat radiates from one baseplate to another. In an embodiment, the two radiators make physical contact with each other. In an embodiment, the two radiators are in full thermal communication with each other in the closed state but do not make physical contact. This may have the advantage of preventing potential degrading of a coating applied to the radiators. In an embodiment, the two radiators have a 100% view factor to each other in the closed state. Where the two radiators are as close to each other as possible and have a view factor to each other as close to 100% as possible, the radiators are blocked from exchanging heat with the environment, and the thermal radiator shutter is thermally isolated from the environment. Generally, in the closed state (e.g., as shown in FIG. 1B), a form of thermal short-circuiting is achieved with the thermal radiators by creating a 100% view factor to each other (or by increasing the view factor to one another, and decreasing the view factor to deep space, as much as possible, or as much as is necessary to achieve an acceptable view factor).

Generally, the thermal radiator shutter is configured to provide a benefit by having a closed view factor that is smaller than the open view factor. A key idea is that, in some embodiments, the thermal radiator shutter is configured such that the stored energy (thermal, phase transition, or electrical) rate of use should be roughly equal to the rate of energy dissipation for the duration of the "night". For example, the longer the survival duration, the smaller the rate of heat loss that can be tolerated and the bigger change in view factor provided.

Lunar applications provide a strong driving case. Such an environment presents no convection, strong thermal radiation loss/gain, and long durations of night and day.

In an embodiment, the view factor of the thermal radiator shutter changes nonlinearly as the shutter closes. For example, the first 10 degrees of closure may have much less effect than the final 10 degrees of closure.

In an embodiment, when the thermal radiator shutter is in the open configuration, the view factor to space is at least 80%. For example, in an embodiment implemented on a lunar rover, the view factor to space in the open configuration may be approximately 80%. In some embodiments, a view factor of 100% in the open configuration is achievable and may be implemented. In the open configuration, the radiators transfer heat to deep space by maximizing their respective view factors to deep space, keeping components below their operational temperature limit. In the closed configuration, the view factor between the radiator pair is maximized, which minimizes radiative heat loss to space. Radiators are sized to provide adequate margin recognizing that 100% view factor between the radiator pairs may not be realistic (in some implementations). In some embodiments, the view factor may be at most 20% in the closed configuration (i.e., the shutter is configured to close sufficiently that the view factor is no more than 20%).

In an embodiment, in the closed state, the two radiators are brought together to reduce their view factor to deep space and increase their view factor to one another, but do not make physical contact with each other. In an embodiment, a cap, skirt, or other covering is provided about one or both radiators so as to cover the edges of one or both radiators to reduce heat leakage from the edges of the one or both radiators. Such a cap or skirt may be made of multi-layer insulation.

To achieve the open state, an actuator is used to separate the first and second baseplates, thereby separating the two radiators and allowing the two radiators to reject heat. In an embodiment, the second baseplate moves from a closed position in which the second baseplate is substantially parallel to and atop the first baseplate to an open position in which the second baseplate is substantially perpendicular to the first baseplate, e.g., at 90 degrees relative to the first baseplate. In an embodiment, the second baseplate moves from a closed position in which the second baseplate is substantially parallel to and atop the first baseplate to an open position in which the second baseplate rotates past 90 degrees relative to the first baseplate, e.g., at 180 degrees relative to the first baseplate. In an embodiment, in the closed position, there is a 0% view factor of each radiator to the environment (i.e., there is a 100% view factor of each radiator to the other radiator). In an embodiment, in the open position, there is a 100% view factor of each radiator to the environment (i.e., there is a 0% view factor of each radiator to the other radiator). The open position may be any position that is not the closed position, e.g., any position in which the second baseplate is not substantially parallel to and atop the first baseplate. In such a case, the second baseplate is moveable (deployable), while the first baseplate is stationary. The open position may be any position that increases the view factors of each radiator to the environment compared to the closed position. The open position may be determined by an extant actuator system of a rover or other spacecraft. For example, the second baseplate may be mounted on a rover mast that is configured to be deployed to a position that is generally perpendicular relative to a platform on which the mast is mounted, or on a robot arm that closes its radiator when stowed and opens its radiator when deployed. While embodiments in which the first and second baseplates are each moveable are possible and contemplated by the present disclosure, having one baseplate stationary and one baseplate (or more) deployable may advantageously provide simplicity and may be compatible with conventional system configurations (e.g., a rover with a rover body/warm electronics box and a deployable mast).

The actuator used to move the second baseplate from the closed position to the open position may already be present on the rover. That is, the thermal radiator shutter may be implemented as a system, method, or device atop or integrated with an existing rover or other spacecraft or system. Accordingly, systems, methods, and devices for implementing or integrating the thermal radiator shutter of the present disclosure are further expressly disclosed herein. Furthermore, a method of retrofitting components, including radiators as described herein, to a rover or other spacecraft in order to effect the thermal radiator shutter of the present disclosure is expressly contemplated. Such a method may include providing a rover including a first baseplate, a second baseplate, and an actuator for moving the second baseplate from a closed position to an open position, and disposing first and second radiators on the first and second baseplates, respectively, as herein described.

By moving between closed and open states, the dual-baseplate shutter provides planar separation of two thermal control zones, one on each of the first and second baseplates. This allows the system on which the dual-baseplate shutter is implemented, such as a rover, to assume configurations that promote either heat sharing or heat dissipation as is required by the associated operation.

In the closed state, the dual-baseplate shutter increases thermal mass sharing heat, thereby increasing the thermal inertia of the rover, spacecraft, or other vehicle or system on which the dual-baseplate shutter is implemented.

In the closed state, the dual-baseplate shutter eliminates the radiator view factor to the environment. In an embodiment, the dual-baseplate shutter does not use sophisticated thermal hardware such as pumped fluid loops (PFL), looped heat pipe (LHP), or variable conductance heat pipe (VCHP). In an embodiment, the dual-baseplate shutter uses a VCHP.

In an embodiment the actuator includes a hinge or operates according to the principles of a hinge. In such an embodiment, the thermal radiator shutter may be referred to as a hinged thermal radiator shutter. The hinge may connect the first and second baseplates and promote a hinge-type movement of the second baseplate relative to the first baseplate when moving between the open and closed configurations.

In an embodiment, the actuator is a linear actuator.

Any suitable actuator for moving the radiators as close to each other as possible is expressly contemplated by the present disclosure. In an embodiment, the actuator moves the baseplates together such that each radiator has a 100% view factor to the other.

The thermal radiator shutter of the present disclosure may provide various advantages.

The dual-baseplate shutter allows independent thermal control zones to be established in a spacecraft (or other vehicle or system). Temperature-sensitive components may be placed at desired locations or positions during hot operations and brought together in a compact package for cold operations or survival.

The dual-baseplate shutter provides a compact package of sensitive components, which increases thermal mass sharing heat and therefore slows down the cooling process.

Compared to existing solutions where a PFL, LHP, or VCHP is used to provide variable coupling between a baseplate and a radiator, the thermal radiator shutter of the present disclosure completely de-couples the radiator from the environment. In the closed state, this can create a fully insulated box, minimizing the heater power required for thermal management.

Compared to existing solutions, such as PFL, LHP, or VCHP, the thermal radiator shutter of the present disclosure may provide a simpler, more reliable, and lower cost thermal control solution.

Although the present disclosure includes embodiments directed to the lunar surface environment, e.g., lunar night survival, lunar day survival, it is to be understood that this is one exemplary application of the systems, methods, and devices of the present disclosure. Other applications characterized by either hot or cold temperature extremes and variations, or prolonged hot or cold periods, are expressly and explicitly disclosed. It will be appreciated by one of skill in the art that lunar night survival is an example of both a cold temperature extreme and a prolonged cold period.

A further objective and advantage of the present disclosure includes the reduction of volume, mass, cost, complexity, and electrical power consumption, while satisfying reliability requirements. In addition, the rover to which the present disclosure is applied is able to withstand the extreme temperature variations of the lunar environment.

A further design consideration includes mass and volume constraints. Such constraints affect the selection and placement of thermal hardware, as well as the size of radiators. In addition, sizing of the battery or batteries is a key factor when resistive heaters are used for lunar night survival. From a structural perspective, lightweight solutions with high specific stiffness and strength are preferred.

The lunar surface represents a harsh thermal environment, especially at the lunar poles. The rover may be exposed to deep space temperatures, given the absence of atmosphere on the Moon. Furthermore, the lunar surface temperature varies significantly between lunar night and day, by as much as 300° C. Consequently, it is a further objective and advantage of the present disclosure to provide physical and thermal architecture that is versatile and efficient to accommodate such variations.

The impact of extreme surface temperatures on the rover is compounded by the lengthy duration of the lunar day and night. Each lunar day-night cycle lasts approximately 700 hours. Therefore, it is desirable to provide a thermal radiator shutter that assists the rover in surviving long, cold lunar nights, while reaching hot steady-state temperatures during day operations. To minimize the battery mass, strict requirements for the use of heater energy are levied on the thermal radiator shutter.

While there is extensive heritage in the design and development of low temperature electronics for Mars missions, with typical minimum non-operating temperatures in the range of −120° C. to −125° C., qualification of sensors, cameras, and electronics for such low temperatures has presented challenges in the past.

Lowering the allowable limit may assist in conserving battery energy during lunar night, by reducing the demands on the heater power. However, qualifying components to such low temperatures may have significant impact on cost, complexity, and scheduling, and so it is preferred to avoid low temperature electronics qualification, hence an object of the present disclosure is to maintain the electronics at around −55° C. for night survival.

Active thermal control systems, such as pumped fluid loops and deployable radiators, require electrical power for their operation and add significant complexity to the design of a spacecraft. Such systems include single points of failure, thus reducing the reliability of the spacecraft. Accordingly, a predominantly passive thermal architecture is preferred.

Figure 1B:
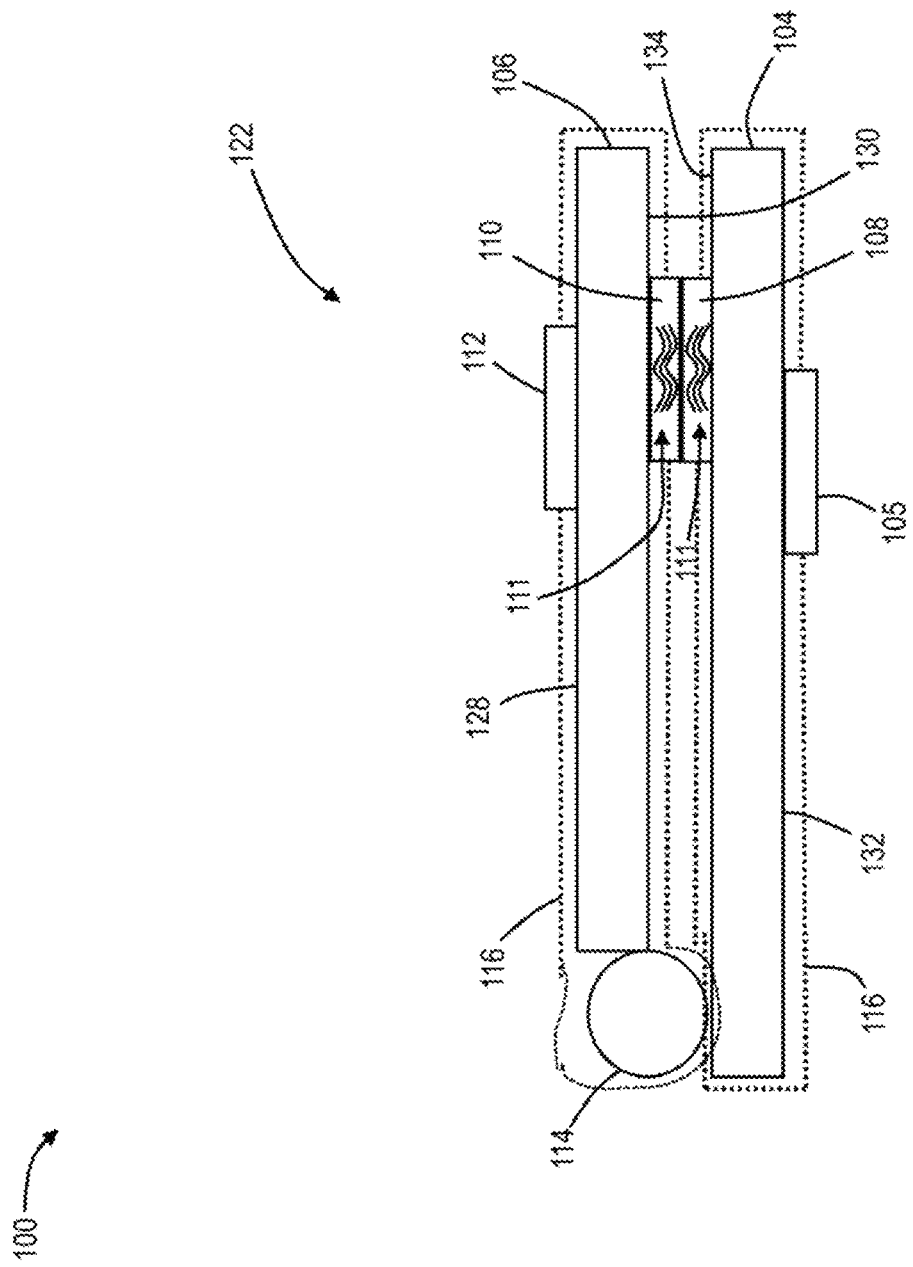
FIG. 1B is a side view schematic diagram of the thermal control system of FIG. 1A in a closed configuration for conserving heat, according to an embodiment.

Referring now to FIGS. 1A and 1B, shown therein is a dual-baseplate shutter 100, according to an embodiment. The dual-baseplate shutter 100 is a thermal control device and may be used as part of a thermal control system (e.g., with one or more other components). The dual-baseplate shutter 100 is shown in an open configuration 102 in FIG. 1A and a closed configuration 122 in FIG. 1B.

Generally, the open configuration 102 may be used to dissipate or reject heat during operation of system components (e.g., during space exploration system operation). The heat rejection or dissipation occurs when there is a net generation or absorption of heat (which usually occurs during system operation). The closed configuration 122 may be used during a "survival" period of the system to minimize heat rejection or dissipation.

The dual-baseplate shutter 100 may be used to provide a benign thermal environment for a rover (e.g., a lunar rover), other spacecraft, and subsystems thereof. The dual-baseplate shutter 100 achieves this objective by controlling extreme temperature variations, minimizing temperature gradients, and maintaining constituent components within their allowable operating and non-operating temperature range throughout operation.

The thermal radiator shutter 100 includes a first baseplate 104 and a second baseplate 106. The first and second baseplates 104, 106 are coupled, directly or indirectly, such that at least the second baseplate 106 is moveable relative to the first baseplate 104. In the embodiment of FIGS. 1A-1B, the first baseplate 104 is stationary and the second baseplate 106 is moveable between a stowed configuration (corresponding to the closed configuration 122) and a deployed configuration (corresponding to the open configuration 102).

Throughout the present disclosure, it is to be understood that, in some embodiments, the first baseplate 104 may include, may be included in, or may be a warm electronics box (WEB), rover, or body of a rover. Similarly, throughout the present Figures and throughout the present application, it is to be understood that the second baseplate 106 may include, may be included in, or may be a mast.

The first and second baseplates 104, 106 may be composed of any suitable material that provides appropriate structural, thermal, or environmental protection functions, as needed. The first and second baseplates 104, 106 may be aluminum panels. To minimize mass and volume, materials with high specific stiffness and strength may be selected for the first and second baseplates 104, 106, such as aluminum honeycomb panels.

The first and second baseplates 104, 106 may be of any suitable shape that serves the functions of mounting components and enabling movement between the open and closed configurations 102, 122 and on which radiators may be disposed. Such shape is not particularly limited. In an embodiment, the baseplates 104, 106 are flat plates or panels. In an embodiment, the baseplates 104, 106 are tubular in shape. In an embodiment, the first and second baseplates 104, 106 vary in design (e.g. material, size, shape). In an embodiment, the second baseplate 106 is a mast as depicted in FIGS. 1A, 1B, and the first baseplate 104 is part of a warm electronics box (WEB) as depicted in FIGS. 1A, 1B and more particularly shown in FIGS. 2A, 2B. In an embodiment where the second baseplate 106 is a mast, the mast may be configured only to hold avionics and receive launch loads. In an embodiment, where the first baseplate 104 is a WEB, the WEB may also hold avionics and receive launch loads and may further have more stringent structural requirements. The mast may include a tubular post but not include a box body, while the WEB may include a box body. The WEB may further hold scientific instruments, e.g., cameras and antennas.

In an embodiment, one or more of the first and second baseplates 104, 106 may be a honeycomb panel. The honeycomb panel may include a core and a face sheet. One or both of the core and face sheet may be composed of aluminum. Aluminum may be preferred to other materials, such as graphite or Kevlar, because of its higher thermal conductivity.

The first baseplate 104 has a first side 132 and a second side 134. The second side 134 is generally opposite the first side 132.

The first side 132 has a first temperature-controlled component 105 mounted thereto. The mounting is such that the first temperature-controlled component 105 is thermally coupled to the first baseplate 104.

The first temperature-controlled component 105 may be a single temperature-controlled component or a set of temperature-controlled components. The first temperature-controlled component 105 may include one or more electronic devices. For example, the first temperature-controlled component 105 may be an avionics component. The first temperature-controlled component 105 may be understood to be in a first independent thermal zone.

The second side 134 includes a first radiator 108 for rejecting or dissipating heat 111, generated by the first temperature-controlled component 105, via a first radiative surface 113. The first radiator 108 in the open configuration 102 has a view factor to deep space via the first radiative surface 113 for rejecting the heat 111.

The second baseplate 106 has a first side 128 and a second side 130. The second side 130 is generally opposite the first side 128. The entire second baseplate 106 may be a mast of a rover or other vehicle or system platform.

Stowing the second baseplate 106 reduces the view factor of the radiators 108, 110 to the environment. In an embodiment, stowing the second baseplate 106 reduces the view factors of the radiators 108, 110 to 0%.

The second side 128 has a second temperature-controlled component 112 mounted thereto. The mounting is such that the second temperature-controlled component 112 is thermally coupled to the second baseplate 106. The second temperature-controlled component 112 may be a single temperature-controlled component or a set of temperature-controlled components. The second temperature-controlled component 112 may include one or more electronic devices.

In particular, the second temperature-controlled component 112 may be a device that needs to be disposed at a certain height or position when in operation and is thus deployed on the second baseplate 106 (e.g., a mast). Advantageously, when the second baseplate 106 is in the open configuration 102, the certain height or position is achieved. Examples of second temperature-controlled component 112 include, without limitation, cameras, antennas, imaging payloads, sensors, or the like. Such components may both require temperature control and an operative position high enough to provide suitable field of view or situational awareness or functions such as pan and tilt. Accordingly, the thermal radiator shutter 100 is particularly well suited for applications that utilize temperature-controlled components that require elevation when in operation.

The second side 130 includes a second radiator 110 for rejecting heat 111, generated by the second temperature-controlled component 112, via a second radiative surface 115. The second radiator 110 in the open configuration 102 has a view factor to deep space via the second radiative surface 115 for rejecting the heat 111.

Although the operation of the first radiator 108 and the second radiator 110 has been described in terms of rejecting the heat 111, a person skilled in the art would appreciate that each or both of the first radiator 108 and the second radiator 110 may be considered to be rejecting, dissipating, and/or radiating the heat 111.

It will be further appreciated that the first radiator 108 and the second radiator 110 may or may not be similar or identical.

The first and second radiators 108, 110 may have sizes and geometries that allow them to act as radiators when deployed (i.e., in the open state) and act as view blockers to the other radiator when closed (i.e., in the closed state).

The first baseplate 104 and the second baseplate 106 are covered in a thermal insulation material 116. The thermal insulation material 116 may be multi-layer insulation that covers and protects exterior or exposed surfaces of the first baseplate 104 and the second baseplate 106. Generally speaking, the thermal insulation material 116 is applied in such a way that temperature-controlled components and other temperature-sensitive components are not directly exposed to the external environment. Where not all surfaces of the baseplate are exterior surfaces (i.e., exposed to the external environment), such as where the first side 132 is an interior side of a top panel of a box, the thermal insulation material may only be applied to those surfaces that are exterior-facing.

Subsequent Figures may depict embodiments of the thermal radiator shutter 100 without depicting the thermal insulation material 116 in order to promote clarity of the subsequent Figures. It will be appreciated by a person of skill in the art that the thermal insulation material 116 is present in the depicted embodiments of the thermal radiator shutter 100.

In some embodiments, the first radiator 108 and the second radiator 110 may be a piece of material that is separate from the respective baseplate (e.g., a panel mounted to the respective baseplate 104 or 106). Such a radiator 108 or 110 may be referred to herein as a "dedicated radiator". In other embodiments, the radiators 108, 110 may be sections of the respective baseplates 104, 106 not covered by the thermal insulating material 116 or from which the thermal insulating material 116 has been removed. Such a radiator 108 or 110 may be referred to herein as a "cutout" radiator.

The radiators 108, 110 are mounted to or provided on the respective second side 134 of the first baseplate 104 and the second side 130 of the second baseplate 106. The radiators 108, 110 serve the purpose of releasing the internally generated waste heat 111 into the environment.

The radiators 108, 110 may use a low absorptivity and high emissivity coating to minimize the absorbed solar flux, while maximizing the heat rejection capability of the surface of the radiators 108, 110. Apart from the foregoing thermo-optical properties, other advantages of the radiators 108, 110 include the compatibility of the coating with the lunar surface environment, such as vacuum, charging, high radiation and UV resistance.

In an embodiment, both the first radiator 108 and the second radiator 110 are dedicated radiators, i.e., each radiator 108, 110 comprises a piece of material separate from the respective baseplate 104, 106, e.g., a panel mounted thereto. In another embodiment, both the first radiator 108 and the second radiator 110 are cutout radiators, i.e., sections of the respective baseplates 104, 106 not covered by the thermal insulating material 116 or from which the thermal insulating material 116 has been removed. In an embodiment, the first radiator 108 is a dedicated radiator, and the second radiator 110 is a cutout radiator. In an embodiment, the first radiator 108 is a cutout radiator and the second radiator 110 is a dedicated radiator, or vice versa.

The first radiator 108 and the second radiator 110 may be of the same size so as to thermally couple and form a closed loop in the closed configuration 122.

The first radiator 108 and the second radiator 110 may be of different sizes but still configured to thermally couple and form a closed loop in the closed configuration 122.

The first radiator 108 and the second radiator 110 are positioned on the respective baseplates 104, 106 such that, when the first and second baseplates 104, 106 are in the closed state, the first and second radiators 108, 110 align with one another.

The thermal radiator shutter 100 further includes an actuator 114 for actuating the second baseplate 106 to move from the open configuration 102 to the closed configuration 122. The actuator 114 is connected to the second baseplate 106. The actuator 114 may be connected to the first baseplate 104 or some other platform that is a component of the system in which the thermal radiator shutter 100 is implemented. The actuator 114 may include any suitable mechanism for moving the second baseplate 106 away from and towards the first baseplate 104 along an arcuate path 117. The actuator 114 may be a mast actuator suitable for opening and closing the thermal radiator shutter 100. The mast actuator may include an electromechanical motor and gearbox actuator.

In another embodiment, the first and second baseplates 104, 106 may be mounted on first and second booms, respectively, of a multi-boom robotic arm. Movement of the booms may cause the first and second baseplates 104 to occupy the open and closed configurations, thereby controlling the view factor of the respective radiators. In an example, when the robotic arm is stowed, the first and second baseplates 104, 106 are stowed with a low view factor to space. When the robotic arm is operational, the radiative surfaces of the radiators 108, 110 reject waste heat to the environment. In such an embodiment, the thermal radiator shutter may or may not have its own mechanical actuator. In cases where the thermal radiator shutter does not have its own mechanical actuator, the thermal radiator shutter utilizes the arm actuator to move the baseplates 104, 106 between the open and closed state indirectly as the arm actuator moves one or more of the booms on which the baseplates are mounted.

The thermal radiator shutter 100 may further include an actuator control system or actuator controller (not shown). The actuator controller automatically controls the operation of the actuator 114. The actuator controller generates and sends a signal to the actuator 114 controlling operation of the actuator.

The actuator controller may include or receive signals from sensors for detecting a first condition corresponding to moving from the closed state 122 to the open state 102 and may send a control signal to the actuator 114 to cause the actuator 114 to actuate the second baseplate 106 from the closed state 122 to the open state 102.

The actuator controller may include or receive signals from sensors for detecting a second condition corresponding to moving from the open state 102 to the closed state 122 and may send a sensor signal to the actuator 114 to cause the actuator 114 to actuate the second baseplate 106 from the open state 102 to the closed state 122.

Movement from the open state 102 to the closed state 122 or from the closed state 122 to the open state 102 may be based on a determination that sensor data has met a predetermined threshold value. The sensor data may relate to an environmental condition of the surrounding or external environment of the thermal radiator shutter 100. For example, the sensor data may be temperature data collected by a temperature sensor or sunlight data collected by a sunlight sensor. The one or more sensors that collect and provide the sensor data analyzed by the actuator controller may be a component of the thermal radiator shutter 100. The one or more sensors may be external to the thermal radiator shutter 100, for example as part of an extant system (e.g., robotic arm, rover, other robotic system), and the actuator controller may be configured to receive and process the sensor data that the extant system collects. The actuator controller may receive the sensor data and compare the received sensor data to a predetermined threshold value (e.g., stored in a data storage device or memory of the actuator controller or accessible to the actuator controller) to determine whether the threshold is met. If the threshold is met, the actuator controller may generate and send a control signal to the actuator 114 to move from the open state to the closed state or vice versa. In a particular embodiment, the sensor data includes sunlight intensity data collected collaterally by a solar panel system when generating power.

In an embodiment, the determination by the controller to move between the open configuration 102 and the closed configuration 122 is made based on a clock or other timing device. In an embodiment, a human or other external operator sends a signal to the control system to change configurations from the open configuration 102 to the closed configuration 122 (or vice versa), e.g., by typing a command, depressing a button, or clicking a computer peripheral at a location remote to the thermal radiator shutter 100 (and system within which the thermal radiator shutter 100 is implemented). In response to receiving the input, the control system generates the control signal and sends the control signal to the actuator 114 which actuates the second baseplate 106 based on the control signal.

In an embodiment, the actuator 114 is operated by or controlled by an external actor, e.g., a robotic device, a human operator, or the like.

The actuator 114 may be a human moving the second baseplate 106. The actuator 114 may be a robotic component for moving the second baseplate 106 (e.g., a robotic arm). The actuator 114 may be autonomous.

In the closed state 122 shown in FIG. 1B, the view factor of each radiator 108, 110 to the external environment is entirely blocked.

Moreover, each of the first baseplate 104 and the second baseplate 106, along with the respective radiators 108, 110, may be considered independent baseplate-radiator systems. As the two radiators 108, 110 are brought together, such independent baseplate-radiator systems are closed to form a single, thermally-closed system.

Furthermore, as the mass of each of the baseplates 104, 106 is consolidated as shown in FIG. 1B, the resulting system 100 in the closed state 102 is more thermally efficient as each baseplate 104, 106 shares heat with the other baseplate 106, 104, respectively.

Figure 2A:
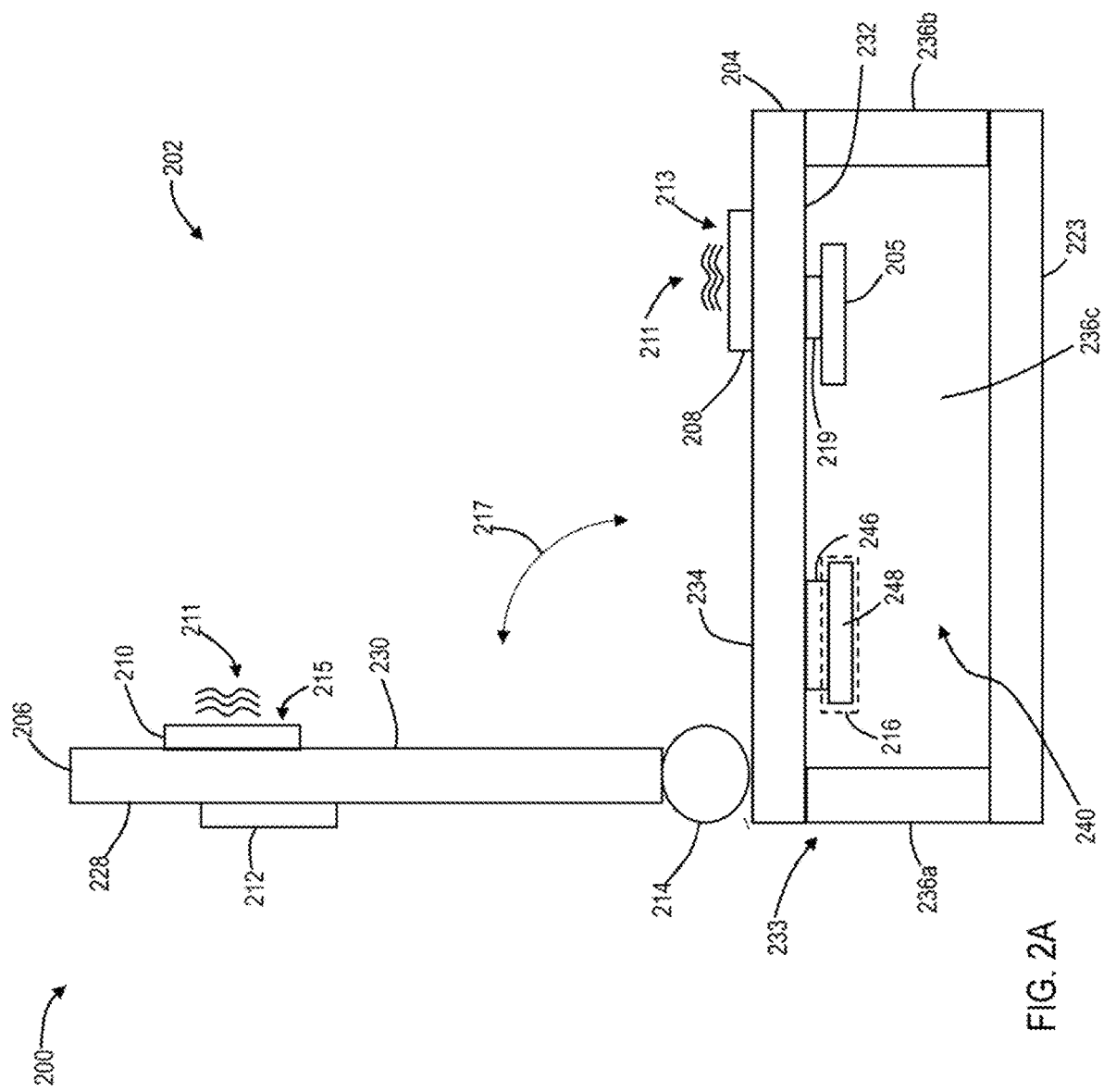
FIG. 2A is a side view cross-sectional schematic diagram of a thermal control system having two baseplates, one of which is part of a warm electronics box or housing that includes two independent thermal zones, the thermal control system in an open configuration for rejecting heat, according to an embodiment.
Figure 2B:
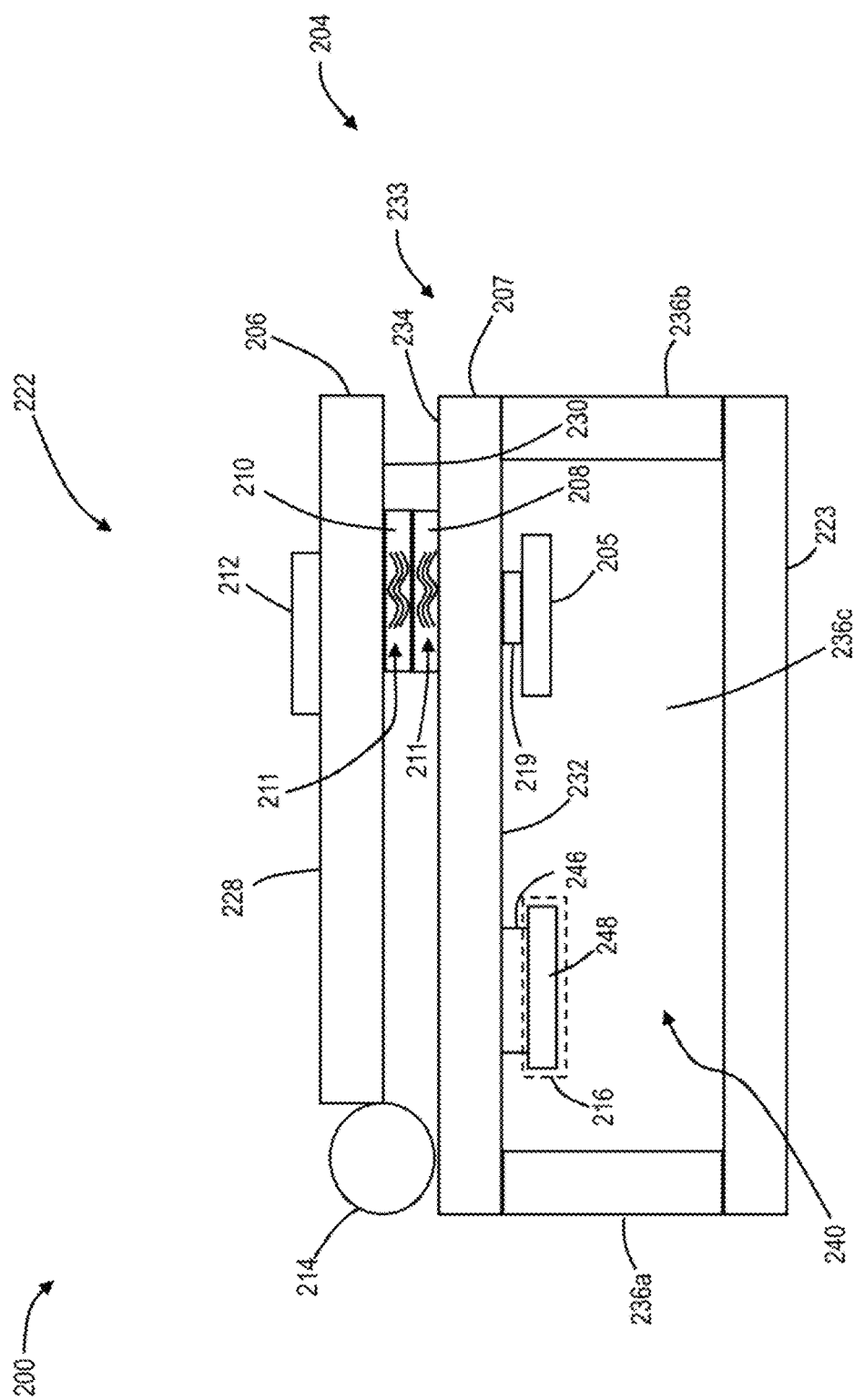
FIG. 2B is a side view cross-sectional schematic diagram of the thermal control system of FIG. 2A in a closed configuration for conserving heat, according to an embodiment.

Referring now to FIGS. 2A and 2B, shown therein is a dual-baseplate shutter 200, according to an embodiment. The dual-baseplate shutter 200 is a thermal control device and may be used as part of a thermal control system (e.g., with one or more other components). The dual-baseplate shutter 200 is shown in an open configuration 202 in FIG. 2A and a closed configuration 222 in FIG. 2B.

Throughout FIGS. 2A and 2B, like references denote like components with respect to FIGS. 1A and 1B (e.g., 114 corresponds to 214, etc.). Certain components present in FIGS. 2A-2B with corresponding components in FIGS. 1A-1B may not be described in detail. It is understood that such components perform the same or similar function as the corresponding component in FIGS. 1A-1B.

In the thermal radiator shutter 200, the first baseplate is implemented as a top panel 204 of a housing 233 that further includes a bottom panel 223 and four side panels. The four side panels include first side panel 236a, second side panel 236b, third side panel 236c, and a fourth side panel that is not visible due to the cross-sectional nature of FIG. 2A. Side panels are referred to collectively as side panels 236 and generically as side panel 236. Collectively, the panels 204, 223, and 236 enclose an interior compartment 240 of the housing 233. The housing 233 may be a warm electronics box ("WEB").

The housing 233 may be thermally insulated by applying a layer of thermal insulation to cover exterior surfaces of the panels 204, 223, 236.

The housing 233 may provide structural and environmental protection functions to components disposed in the interior compartment 240, in addition to thermal functions described in respect of FIGS. 1A-1B. The housing 233 may also provide structural support for mounting of external components, such as wheel or other mobility subsystems, solar panels for electrical power subsystems, and a mast (e.g., the baseplate 206).

The thermal radiator shutter 200 further includes a third temperature-controlled component 248 mounted to the first side 232 of the first baseplate 204 and a heat switch 246 disposed between the third temperature-controlled component 248 and the first side 232 of the first baseplate 204 such that the heat switch 246 regulates or controls thermal coupling or conductance between the third temperature-controlled component 248 and the first baseplate 204. The heat switch 246 controls the flow of heat to the first baseplate 204. By regulating thermal conductance between the third temperature-controlled component 248 and the first baseplate 204 via the heat switch 246, a second, independent thermal zone is created inside the housing 233.

The third temperature-controlled component 248 may be a set of temperature-controlled components.

The third temperature-controlled component 248 may be enclosed or covered in its own layer of thermal insulation. In FIGS. 2A, 2B, the layer of thermal insulation particular to the third temperature-controlled component 248 is depicted as a further layer of thermal insulation 216.

The third temperature-controlled component 248 may be a device that operates at a different temperature than the first temperature-controlled component 205 (also mounted on the first baseplate 204) and/or which may have a different maximum and/or minimum survival temperature than the first temperature-controlled component 205 (i.e., a temperature beyond which the respective temperature-controlled component may be temporarily or permanently damaged or non-functional). In an embodiment, the third temperature-controlled component 248 is a battery.

In an embodiment, the heat switch is an active device.

In an embodiment, the heat switch 246 is passive. In an embodiment, the passive heat switch includes a phase-change material (PCM). The PCM may provide a temperature-dependent thermal conductance by thermally coupling the third temperature-controlled component 248 to the first baseplate 204 under a first condition (e.g., during the lunar day, during periods of greater heat relative to a set point) and thermally decoupling the third temperature-controlled component 248 from the first baseplate 204 under a second condition (e.g., during the lunar night, during periods of lesser heat relative to a set point) to create two thermal zones in the interior compartment 240 with separate temperature set points. Such thermal conductance is achieved according to the temperature of the warmer side of the PCM.

Accordingly, during periods of lower heat, particularly where heat achieved by the first baseplate 204 in general is less than a minimum allowable temperature for the third temperature-controlled component 248, the PCM remains solid and does not transfer heat between the first baseplate 204 and the third temperature-controlled component or vice-versa. Where a temperature of the first baseplate 204 is greater than the minimum allowable temperature, the PCM absorbs heat and changes from a first phase into a second phase (e.g., from a solid phase into a liquid phase), which thermally couples the third temperature-controlled component 248 to the first baseplate 204. Where the temperature of the first baseplate 204 is less than the minimum allowable temperature, the PCM changes from the second phase into the first phase (e.g., from the liquid phase into the solid phase) and thermally decouples the third temperature-controlled component from the first baseplate 204.

In an embodiment, the PCM is paraffin-based. The temperature set points are adjustable by selecting paraffin wax with an appropriate phase change point (e.g., appropriate melting point).

Advantageously, paraffin heat switches have higher reliability compared to other thermal control hardware, are entirely passive, and have relatively low complexity. Thermal performance requirements, such as ON (>1 W/K) and OFF (<0.015 W/K) conductance have been established based on the dissipation of the third temperature-controlled component 248 and the need for thermal isolation from the rest of the WEB during lunar night survival. For example, in the embodiment where the third temperature-controlled component 248 is a battery, the battery may have different dissipation characteristics from the first temperature-controlled component 205. Accordingly, it may be advantageous for the battery to be thermally isolated from the rest of the WEB and in particular from the first temperature-controlled component 205 during lunar night survival.

In an embodiment, the heat switch 246 is a variable conductance heat pipe (VCHP). The VCHP may use a closed-loop two-phase liquid flow cycle with an evaporator and a condenser to transport medium to relatively large amounts of heat without using any electrical power. The VCHP includes a reservoir filled with a non-condensable gas (NCG) connected typically to the end of the condenser. The non-condensable gas controls the operating area of the condenser based on the temperature of the evaporator. Accordingly, an effective thermal conductance of the VCHP varies with temperature. Additionally, the non-condensable gas suppresses the freezing of the working fluid during the lunar night, allowing the VCHP to operate below the freezing point of the working fluid. As the temperature drops, the vapor pressure inside the VCHP drops and the NCG expands to maintain pressure equilibrium at the vapor-gas interface, reducing the effective length of the condenser. In an embodiment, the VCHP can be designed such that when the working fluid reaches a temperature limit, the entire condenser section is occupied by the NCG. Accordingly, the working fluid is restricted to an adiabatic and evaporator section of the pipe.

The thermal radiator shutter 200 further includes a conductive thermal filler 219 disposed between the first temperature-controlled component 205 and the first side 232 of the first baseplate 204.

During operation of the thermal radiator shutter 200, the two independent thermal zones within the housing 233 are provided in order to maintain the third temperature-controlled component 248 and the first temperature-controlled component 205 within allowable temperature ranges. Because the battery 248 has a narrower allowable temperature range, the independent thermal zone about the battery 248 is distinct to and separate from the thermal zone about the first temperature-controlled component 205. Because the heat switch 246 regulates or controls thermal coupling or conductance between the battery 248 and the first baseplate 204, the independent thermal zone about the battery 248 is maintained as temperatures on the lunar surface change and fluctuate and even as temperatures of the first base plate 204 change and fluctuate.

In the embodiment where the heat switch 246 is a PCM such as paraffin wax, the battery 248 and the first temperature-controlled component 205 may have similar temperatures when the first baseplate 204 is at a higher temperature, e.g., during the lunar day. In the embodiment where the heat switch 246 is a PCM such as paraffin wax, the thermal conductance of the PCM reduces as the temperature falls so as to thermally isolate the battery 248 from the rest of the housing 233 and components therein, such as the first temperature-controlled component 205. The battery 248 is thermally isolated at lower temperatures because, at lower temperatures, the PCM in the heat switch 246 becomes a solid with lower thermal conductance such that heat is not lost from the battery 248 through the first baseplate 204. At higher temperatures, the PCM melts and gains a higher thermal conductance such that heat flows from the first baseplate 204 (e.g., during the lunar day) through the PCM in the heat switch 246 and into the battery. In the embodiment, the battery 248 is further covered with a further layer of the thermal insulation 216 for radiative insulation.

The thermal radiator shutter 200 may further include at least one heater (not shown) mounted on or near the first, second, or third respective temperature-controlled components 205, 212, 248 for maintaining respective minimum allowable temperatures during the lunar night. The at least one heater may provide heat throughout the baseplates 204, 206. The at least one heater may be a resistive heater. The at least one heater may be mounted in the interior component 240.

The thermal radiator shutter 200 may further include at least one temperature sensor (not shown). The at least one temperature sensor may be a thermistor. The temperature registered by the temperature sensor may be read out by a heater control unit (e.g., disposed in the interior compartment 240). The heater control unit may control operation of the at least one heater based on the temperature read from the thermal sensor (e.g., change output level, turn on/off). In some cases, more than one heater control unit may be used. Where the third temperature-controlled component 248 is a battery, the heater control unit may include a battery management system.

Although the thermal insulation material 216 is not shown about the entirety of FIGS. 2A and 2B, in an embodiment, the thermal insulation material 216 is disposed on all external surfaces of the thermal radiator shutter 200. Whether or not the thermal insulation material 216 is present, the thermal radiator shutter operates to short-circuit the radiator surfaces 211, 213 by creating a view factor as close to 100% as possible therebetween.

Figure 3A:
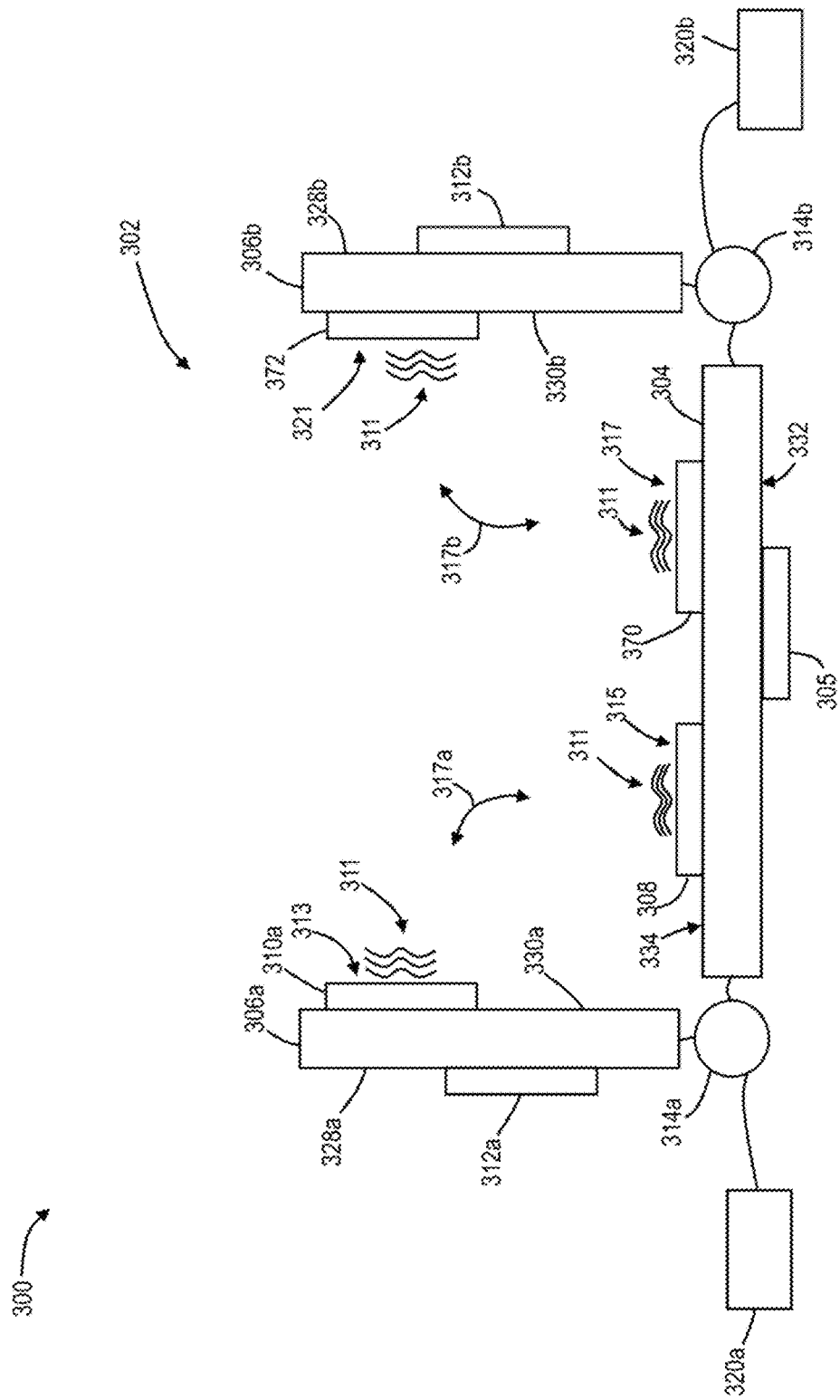
FIG. 3A is a side view schematic diagram of a thermal control system having three baseplates including a stationary baseplate and two moveable baseplates, the thermal control system in an open configuration for rejecting heat, according to an embodiment.
Figure 3B:
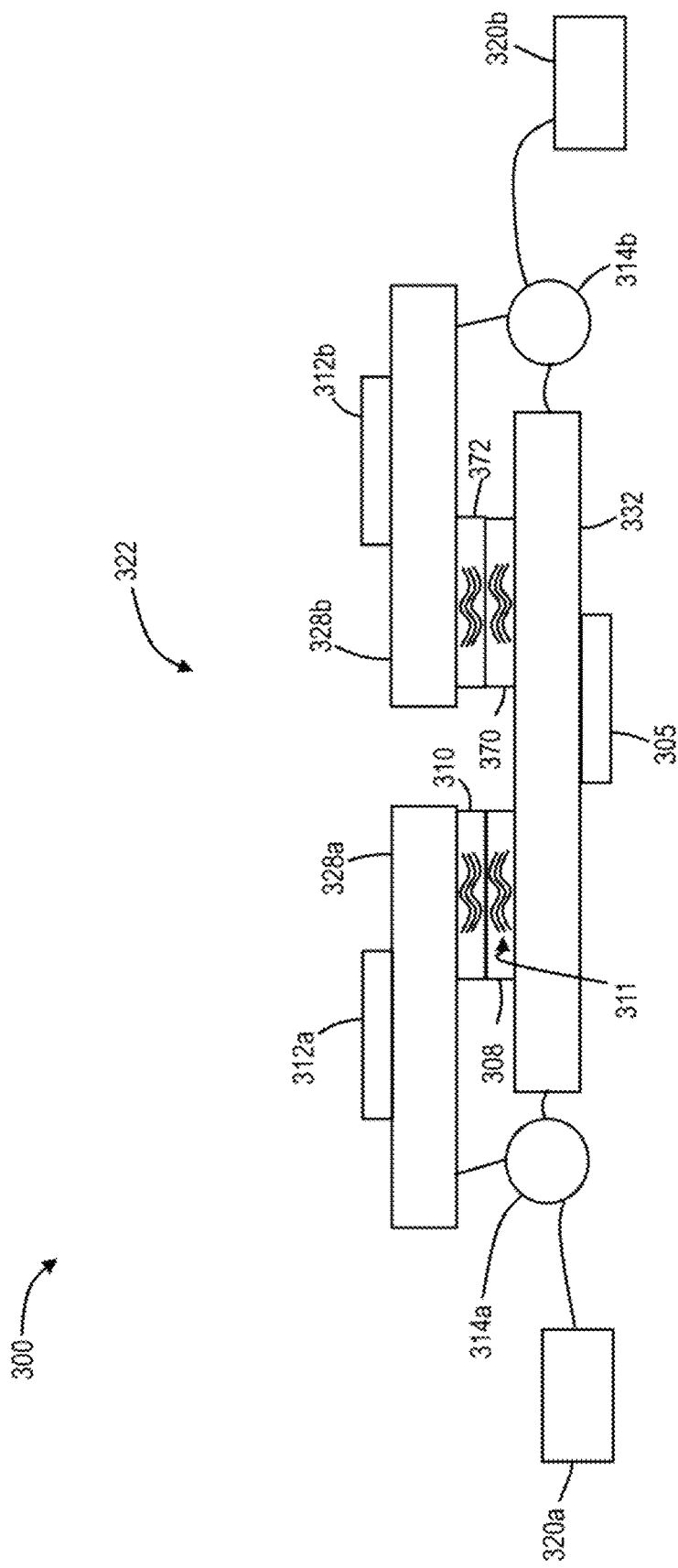
FIG. 3B is a side view schematic diagram of the thermal control system of FIG. 3A in a closed configuration for conserving heat, according to an embodiment.

Referring now to FIGS. 3A and 3B, shown therein are sideview schematic diagrams of a multi (tri)-baseplate thermal radiator shutter 300, according to an embodiment. The multi-baseplate thermal radiator shutter 300 may also be referred to as a multi-radiator shutter.

The multi-baseplate thermal radiator shutter 300 is a thermal control device and may be used as part of a thermal control system (e.g., with one or more other components). The multi-baseplate thermal radiator shutter 300 is shown in an open configuration 302 in FIG. 3A and a closed configuration 322 in FIG. 3B.

Throughout FIGS. 3A and 3B, like references denote like components with respect to FIGS. 1A and 1B (e.g., 114 corresponds to 314, etc.). Certain components present in FIGS. 3A-3B with corresponding components in FIGS. 1A-1B or 2A-2B may not be described in detail. It is understood that such components perform the same or similar function as the corresponding component in FIGS. 1A-1B or FIGS. 2A-2B, respectively.

The thermal radiator shutter 300 includes a third baseplate 306b, in addition to first and second baseplates 304, 306a, respectively. The third baseplate 306b may be structurally and/or functionally equivalent to the second baseplate 306a. The second and third baseplates 306a, 306b are moveable between deployed (open) and stowed (closed) positions.

The third baseplate 306b moves in an arcuate path 317b towards and away from the first baseplate 302 by operation of an actuator 314b connected to the first baseplate 302 and the third baseplate 306b. The actuator is controlled by an actuator control system or actuator controller 320b.

The actuator controller 320a and the actuator controller 320b may be the same actuator controller. The actuators 314a, 314b may both be controlled by a single operator, from a single controller, etc., simultaneously.

The first baseplate 322 further includes a third radiator 370 disposed on the second side 334. The third radiator 370 in the open configuration 302 has a view factor to deep space for rejecting heat 311 via a third radiative surface 317. In this sense, the third radiator 370 may be structurally and functionally equivalent to the first radiator 308.

The thermal radiator shutter 300 further includes a fourth radiator 372 disposed on the second side 330b of the third baseplate 306b for radiating or rejecting heat 311. When the thermal radiator shutter 300 is in the open configuration 302 and the third baseplate 306b is deployed, the fourth radiator 372 has a view factor to deep space for rejecting the heat 311 via a fourth radiative surface 321. The fourth radiator 372 may be structurally and/or functionally equivalent to any of the first radiator 308, the second radiator 310, or the third radiator 372.

The third radiator 370 and the fourth radiator 372 may be dedicated radiators or separate components. The third and fourth radiators 370, 372 may be sections of the respective first and third baseplates 304, 306b not covered by the thermal insulating material (not shown) or from which the thermal insulating material has been removed.

The third radiator 370 and the fourth radiator 372 are of the same or substantially similar size so as to thermally couple and form a closed loop in the closed configuration 322 shown in FIG. 3B. Similarly, the first radiator 308 and the second radiator 310 are of the same or substantially similar size so as to thermally couple and form a closed loop in the closed configuration 322. It will be appreciated, however, that each of the respective third and fourth radiators 370, 372 and first and second radiators 308, 310 may be of different sizes but still configured to thermally couple and form a closed loop in the closed configuration 322.

The third radiator 370 and the fourth radiator 372 are disposed on the respective first and third baseplates 304, 306b such that, when the first and third baseplates 304, 306b are in the closed state 322, the third and fourth radiators 370, 372 align with one another. The first radiator 308 and the second radiator 310 are disposed on the respective first and second baseplates 304, 306a such that, when the first and second baseplates 304, 306a are in the closed state 322, the first and second radiators 308, 310 align with one another.

The thermal radiator shutter 300 and the actuators 314a, 314b thereof may be configured such that the second and third baseplates 306a, 306b are movable along the respective arcuate paths 317a, 317b independently of one another or synchronously to one another.

For example, during operation of the thermal radiator shutter 300, the second baseplate 306a may be in a different position along the arcuate path 317a than the third baseplate 306b occupies along the arcuate path 317b. As a further example, the second baseplate 306a may be in the open configuration 302 while the third baseplate 306b is simultaneously in the closed configuration 322 and vice-versa.

In an embodiment, the actuator controller 320 identifies a closing condition indicating the lunar night and closes the second baseplate 306a and the third baseplate 306b by controlling the respective actuators 314a, 314b to actuate the respective second and third baseplates 306a, 306b along the respective arcuate paths 317a, 317b until the closed configuration 322 is achieved. The actuator controller 320 further identifies an opening condition indicating the lunar day and opens the second baseplate 306a and the third baseplate 306b, i.e., controls the respective actuators 314a, 314b to actuate the respective second and third baseplates 306a, 306b along the respective arcuate paths 317a, 317b until the open configuration 302 shown in FIG. 3A is achieved. While lunar day and night are described as closing and open conditions, respectively, the foregoing is merely one example and, in other implementations, the opening and closing conditions of the thermal radiator shutter 300 may be other than described.

In an embodiment, the actuator controller 320a identifies a first closing condition and closes the second baseplate 306a, while the actuator controller 320b identifies a second closing condition and closes the third baseplate 306b. Similarly, the actuator controller 320a identifies a first opening condition and opens the second baseplate 306a, while the actuator controller 320b identifies a second opening condition and opens the third baseplate 306b. Thus, the actuator controllers 320a, 320b close and open the respective second and third baseplates 306a, 306b independently of one another.

The identification of opening and closing conditions by the actuator controller 320 may be a determination based on a received signal or data. For example, the actuator 320 may determine whether an opening or closing condition is present based on received sensor data or signals collected by one or more sensors in communication with the controller 320. In another example, the actuator controller 320 may determine opening or closing conditions based on a clock or other timing mechanism. In yet another example, the actuator controller 320 may be provided with an input signal (e.g., from a remote or local human user or robot) instructing the controller 320 to change the state of the second baseplate 306a and/or the third baseplate 306b (open to closed, closed to open). In such a case, the input signal may be considered the opening/closing condition.

A signal to open or close the thermal radiator shutter 300 may be received from ground command directing all or some of the operations of the rover.

In an embodiment, the thermal radiator shutter 300 opens when the sun is detected (i.e., when the lunar day begins). Specifically, the thermal radiator shutter 300 detects the sun, which charges a battery of the rover (not shown) by operation of solar panels (not shown). When the first temperature-controlled component 305 is heated to a predetermined operating temperature (e.g., a minimum temperature for survival, a minimum temperature for operation, a maximum temperature for survival, a maximum temperature for operation, a preferred temperature for survival, a preferred temperature for operation), the thermal radiator shutter 300 moves from the closed configuration 322 as shown in FIG. 3B to the open configuration 302 as shown in FIG. 3A.

The determination to move from the closed configuration 322 to the open configuration 302 may be made entirely locally on the rover, e.g., through an on-board logical system (not shown). The determination may be made entirely remotely, e.g., through a remote command, e.g., from ground command. The determination may be made through a combination of local processing and remote signals, e.g., the thermal radiator shutter 300 detects the sun, determines a current temperature of the first temperature-controlled component, and transmits the current temperature to ground command along with a request for permission to move from the closed configuration 322 to the open configuration 302, and ground command replies with a signal either granting or denying the requested permission.

It will be appreciated by one of skill in the art that any combination of local processing and remote signals is included in the described operation of the thermal radiator shutter 300 for moving from the closed configuration 322 to the open configuration 302, provided that such combination substantially achieves substantially all the foregoing objectives of the present disclosure.

Figure 4A:
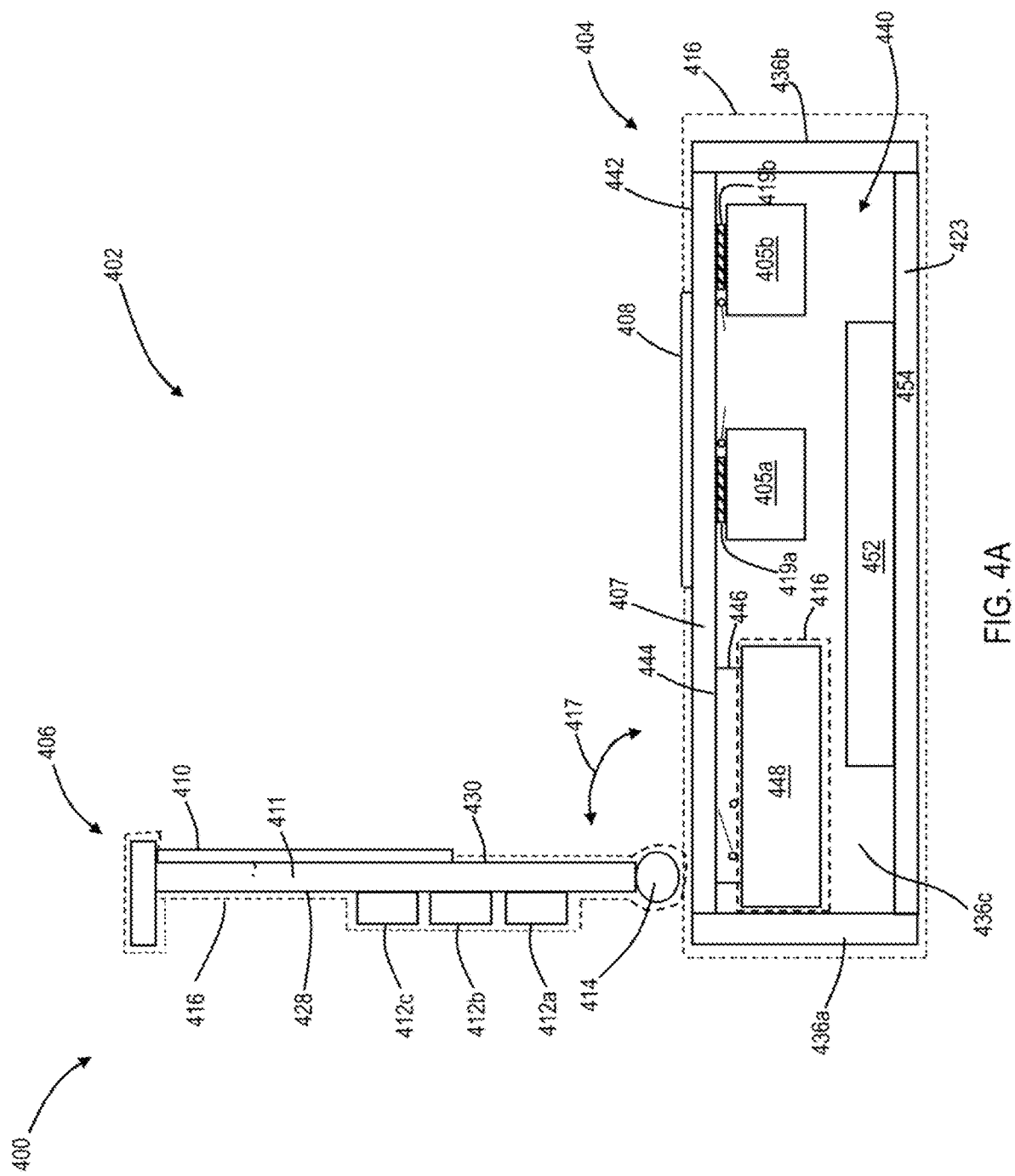
FIG. 4A is a side view cross sectional schematic diagram of a lunar rover thermal control system including a deployable mast and a warm electronics box (or rover body), the lunar rover control system in an open configuration for rejecting heat, according to an embodiment.
Figure 4B:
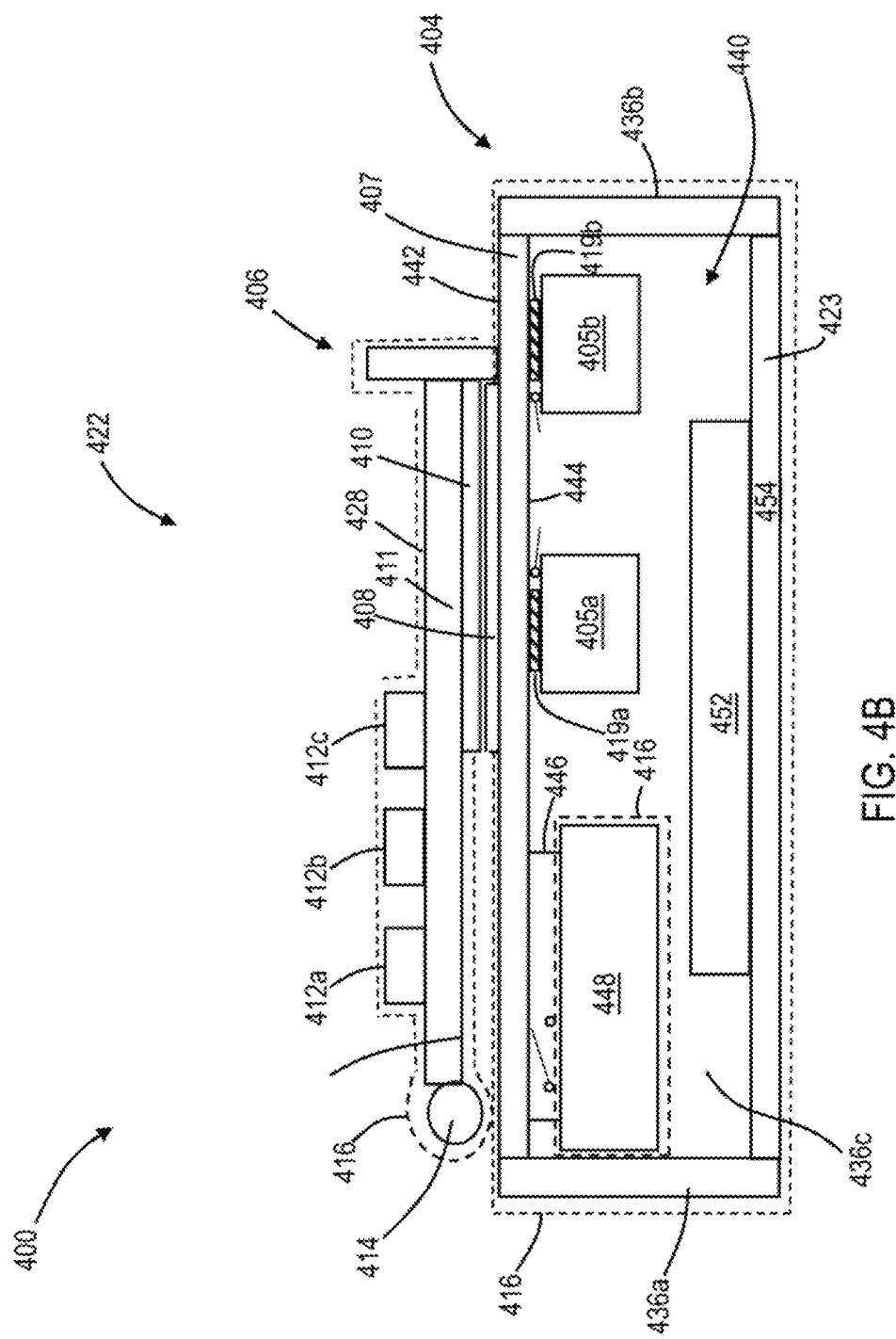
FIG. 4B is a side view cross sectional schematic diagram of the lunar rover thermal control system of FIG. 4A in a closed configuration for conserving heat, according to an embodiment.

Referring now to FIGS. 4A and 4B, shown therein are sideview schematic diagrams of a lunar rover thermal control system 400, according to an embodiment.

The lunar rover thermal control system 400 is a lunar rover dual-baseplate shutter. The thermal control system 400 is configured for use on a lunar rover.

The thermal control system 400 is shown in an open configuration 402 in FIG. 4A and a closed configuration 422 in FIG. 4B.

Throughout FIGS. 4A and 4B, like references denote like components with respect to FIGS. 1A and 1B (e.g., 114 corresponds to 414, etc.). Certain components present in FIGS. 4A-4B with corresponding components in FIGS. 1A-1B, 2A-2B, or 3A-3B may not be described in detail. It is understood that such components perform the same or similar function as the corresponding component in FIGS. 1A-1B, 2A-2B, or 3A-3B, respectively.

The thermal control system 400 includes a warm electronics box ("WEB") 404, a deployable and stowable mast 406, and an actuator 414 for moving the mast 406 between the deployed position (shown in FIG. 4A) and the stowed position (shown in FIG. 4B).

The deployed position of the mast 406 in FIG. 4A corresponds to the open configuration 402 of the thermal control system 400. The stowed position of the mast 406 in FIG. 4B corresponds to the closed configuration 422 of the thermal control system 400.

The WEB 404 includes a top panel 407, a bottom panel 423, and four side panels (only three side panels, 436a-436c, are visible in FIGS. 4A-4B due to the cross sectional view).

The panels 407, 423, 436a, 436b, 436c, and 436d (not shown) together enclose an interior compartment 440 of the WEB 404.

Each of the six panels of the WEB 404 is an aluminum honeycomb panel. In other embodiments, other suitable panel material may be used. The WEB side panels 436a-436d, the WEB bottom panel 423, and the WEB top panel 407 are assembled together using bonded butt joints. The side panels 436a-436d, the bottom panel 423, and the top panel 407 have inserts so that the top panel 407 is removable and may be bolted down atop the side panels 436a-436d.

In the thermal control system 400, the top panel 407 of the WEB 404 functions as the first (or stationary) baseplate of the thermal radiator shutter 400.

The top panel 407 may act as a main mounting plate of the WEB 404. The bottom panel 423 may act as a mounting plate 454 for a neutron spectrometer (NSS) sensor 452.

The system 400 includes a multi-layer insulation ("MLI") 416 applied to exterior surfaces of the WEB 404 (i.e., exterior surfaces of panels 407, 423, 436a-436d).

The MLI 416 covers the outside of the WEB 404. A portion of the top panel 407 is not covered by the MLI 416 (e.g., a cut-out), which acts as a WEB radiator 408 (as described below). The MLI 416 isolates avionics units 405a and 405b (collectively referred to as the avionics units 405 and generically referred to as the avionics unit 405) and a battery 448 from solar heating and deep space cooling. The MLI 416 offers protection from environmental fluxes and radiative losses.

The WEB 404 houses various electronics components used by the rover in the interior compartment 440 including the battery 448, the avionics units 405, and the NSS sensor 452. Each of the battery 448 and the avionics unit 405 is mounted to an underside 444 of the top panel 407 of the WEB 404.

A conductive thermal filler 419a, 419b is disposed between the avionics units 405a, 405b, respectively and the underside 444 of the top panel 407.

A heat switch 446, such as described herein, is disposed between the battery 448 and the underside 444 of the top panel 407. The heat switch 446 functions to create a thermal zone inside the WEB 404 corresponding to the battery 448 that is independent of a thermal zone corresponding to the avionics units 405.

The heat switch 446 is used between the battery 448 and the WEB radiator 404 because of the different minimum allowable temperature of the battery 448 compared to the rest of the WEB 404.

The heat switch 446 offers a temperature-dependent thermal conductance to thermally couple the battery 448 to the radiator 408 for operations during the higher-temperature lunar day and decouple the two during the lower-temperature lunar night to create two thermal zones with separate heater set-points. The thermal conductance is based on the warm side of the heat switch 446. The heat switch 446 may use a phase change material for activation.

The NSS sensor 452 is mounted to the bottom panel 423 of the WEB 404. The WEB bottom panel 423 may be understood as the mounting plate 454 for receiving the NSS 452 for measuring cosmic ray-generated neutrons in lunar surface materials. It will be appreciated that further and other components may be mounted within the WEB 404, for example other electronics or scientific measuring equipment or apparatus.

The WEB 404 includes a WEB radiator 408. The WEB radiator 408 is disposed on a top (externally facing) surface of the top panel 407. The WEB radiator 408 faces the +Z direction. In this embodiment, the WEB radiator 408 is a portion of the top panel 407 that is not covered in the multi-layer insulation 416. The WEB radiator 408 is disposed atop the WEB 404 to maximize a view of the first radiator 408 to deep space and minimize potential lunar dust deposition. The WEB radiator 408 releases internally generated waste heat (e.g., by the battery 448 and the avionics components 405) into the environment.

The mast 406 includes a mast boom 411. The mast boom 411 functions as the second (moveable) baseplate. The mast boom 411 may be an aluminum panel. The mast boom 411 may be configured to pan and tilt.

The system 400 includes a plurality of electronics components 412a, 412b, 412c (collectively referred to as the electronics 412) mounted to the mast boom 411. The electronics 412 are mounted to a first side 428 of the mast boom 411.

The electronics 412 may include, for example, any one or more of cameras, antennas, lighting elements, sensors, or the like. Generally, electronics components that may require or benefit from an elevated position and/or the ability to pan/tilt may be placed on the mast boom 406. In an embodiment, the electronics 412 include a Sensors & Guidance, Navigation, and Control System (GNC). The GNC includes a sensor suite including a mast pan-tilt unit mounted stereo/drive camera, situational awareness cameras, and an inertial measurement unit connected to a GNC computer that includes navigation software and firmware.

The system 400 further includes a mast radiator 410 disposed on the mast boom 411.

The mast radiator 410 is disposed on a second surface 430 of the mast boom 411 (opposing the first surface 428).

The mast radiator 410 is a separate piece of material that is mounted to the second surface 430 of the mast boom 411. In particular, the mast radiator 410 may be an aluminum honeycomb panel. The mast radiator 410 is deployed on the mast 406. The mast radiator 410 may occupy a high position on the mast boom 411 (when in the deployed configuration). This position may provide for minimal dust deposition. The mast radiator 410 releases internally generated waste heat (e.g., by the electronics 412) into the environment.

The WEB and mast radiators 408, 410 may use a low absorptivity and high emissivity coating to minimize absorbed solar flux, while maximizing heat rejection capability of the surface of the radiators 408, 410. Apart from the thermo-optical properties, other key driving requirements may include the compatibility of the coating with the lunar surface environment, such as vacuum, charging, high radiation, and UV resistance.

In an embodiment, the coating is white paint.

The mast radiator 410 may be thermally coupled to dissipating components (e.g., the electronics 412) via bolted interfaces. In an embodiment, thermal straps may be used to further increase the coupling. The dissipating, non-radiator components of the mast 406 (e.g., the electronics 412) are fully covered with the MLI 416 to minimize radiative losses. Apertures may not be covered in thermal insulation material. For example, the dissipating, non-radiator components (e.g., the electronics 412) may include shutters configured to be passively or actively actuated to also minimize the radiative losses during lunar night.

The mast 406 includes the multi-layer insulation 416. The MLI 416 covers the outside of the mast 406, including external facing surfaces of the mast boom 411 and the electronics 412. The MLI 416 does not cover the mast radiator 410.

When the system 400 is in operation, the mast 406 stows during lunar night with the WEB radiator and mast radiator 408, 410 facing each other to eliminate their view factor to deep space.

The actuator 414 may be fully covered by the MLI 416 to minimize the radiation losses during lunar night. The actuator 414 may have a very low duty cycle and may advantageously be used only for a maximum of 2 minutes at a time. Therefore, due to the large thermal mass of the system 400 in the closed configuration 422, the system 400 advantageously does not overheat. In addition, the actuator 414 may be conductively coupled to the WEB 404 and the mast 406, which allows for the heat from the mast actuator 414 to escape to the WEB 404 and/or to the mast 406.

Figure 5:
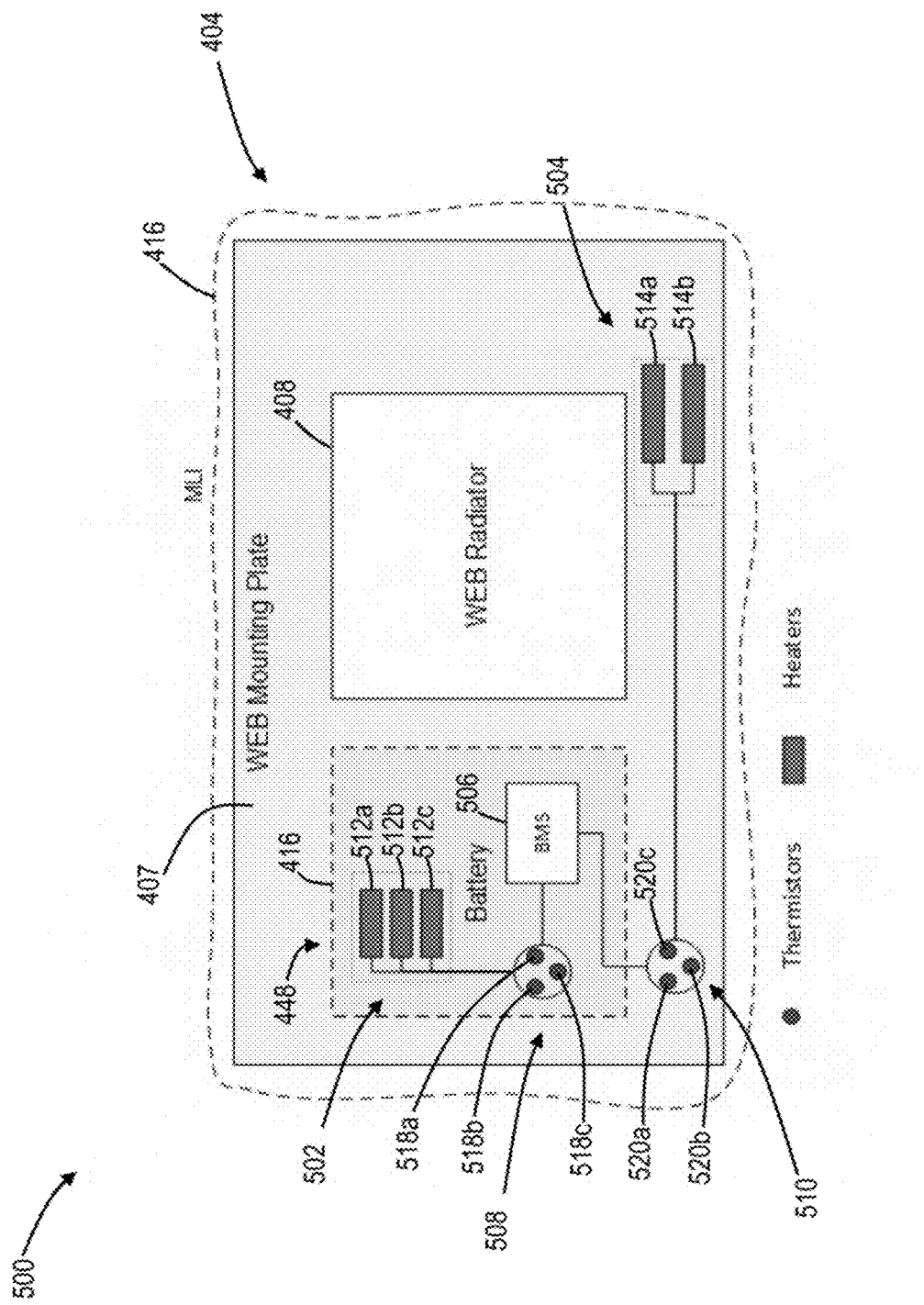
FIG. 5 is a partially transparent top view schematic diagram of an interior of a warm electronics box heater architecture of the lunar rover thermal control system of FIGS. 4A-4B, according to an embodiment.

Referring now to FIG. 5, shown therein is a heater subsystem architecture 500 of the thermal control system 400 of FIGS. 4A-4B, according to an embodiment.

FIG. 5 illustrates a top view of the WEB 404 in isolation. Portions of the top panel 407 of the WEB 404 are transparent to show certain components housed within the interior compartment 440 of the WEB 404 that would not otherwise be visible from a top view.

Also visible in FIG. 5 are the WEB radiator 408 and the battery 448 (which is disposed in the interior compartment 440). The heat switch 446 is similarly transparent in FIG. 5 in order to show the battery 448, some or all of which may not otherwise be visible from a top view.

The heater subsystem 500 includes a battery heater 502, a WEB heater 504, a battery management system 506, a battery thermistor 508, and a WEB thermistor 510.

The battery heater 502 includes heater elements 512a, 512b, and 512c (collectively referred to as the heater elements 512 and generically referred to as the heater element 512). In an embodiment, the battery heater 502 includes a single heater element 512.

The WEB heater 504 includes the heater elements 514a, 514b (collectively referred to as the heater elements 514 and generically referred to as the heater element 514). In an embodiment, the WEB heater includes a single heater element 514.

The battery thermistor 518 includes thermistors 518a, 518b, 518c (collectively referred to as the thermistors 518 and generically referred to as the thermistor 518). In an embodiment, the battery thermistor 518 includes a single thermistor 518.

The WEB thermistor 510 includes thermistors 520a, 520b, 520c (collectively referred to as the thermistors 520 and generically referred to as the thermistor 520). In an embodiment, the WEB thermistor includes a single thermistor 520.

In an embodiment, a thermostat switch (e.g., a bimetallic or paraffin switch) may be used instead of or in addition to the thermistor 518 or the thermistor 520. The thermostat switch is connected in series with the heater element 512 or 514, respectively. The thermostat switch may be any suitable thermostat switch. For example, the thermostat switch may be a bimetallic or paraffin switch.

In other embodiments, the number of the heating elements 512, 514 and the thermistors 518, 520 may vary.

The battery heater 502 and the battery thermistor 508 are located internal to the battery 448.

The WEB heater 504 and the WEB thermistor 520 are located external to the battery 448 but internal to the WEB 404 (i.e., in internal compartment 440 of FIGS. 4A-B).

In an embodiment, the battery heater 502 and the WEB heater 504 are controlled by an on-board computer ("OBC") (not shown). The OBC may be separate to the battery management system 506. The OBC may be disposed within the battery 448 or elsewhere within the WEB 404 or external to the WEB 404 (e.g., within the mast 406).

In an embodiment, the heater elements 512, 514 are resistive heaters. In an embodiment, the heater elements 512, 514 are electric heaters using solid-state heat transfer or other fluid-based thermodynamic cycles. In an embodiment, the heater elements 512, 514 use radioisotope heating. In an embodiment, the heater elements 512, 514 include phase-change materials to be triggered or switched into a thermal circuit.

The battery heater 502 and the WEB heater 504 provide the necessary heat to keep the electronics 412 and the avionics 405 within survival temperature limits during lunar night.

The battery thermistor 518 and the WEB thermistor 520 are communicatively connected to and monitored by the battery management system 506. The battery management system 506 monitors the battery thermistor 508 and the WEB thermistor 510 during hibernation (e.g., during the lunar night) and wake-up (e.g., when the lunar night becomes the lunar day and the OBC is off). The thermistors 518, 520 are used for control of the battery heater 502 and the WEB heater 504, respectively.

The WEB 404 relies on the heater elements 512 and 514 during cold operations, lunar night survival, and wake-up. The battery management system 506 controls the heater elements 512, 514 (and thus the battery heater 502 and the WEB heater 504) by reading out a temperature of the thermistors 518, 520.

The heater elements 512 are disposed in parallel to form the battery heater 502. The heater elements 514 are further disposed in parallel to form the WEB heater 504. Such parallel arrangements offer hot redundancy in case of a heater failure. Set-points of the heater elements 512, 514 may be dynamically changed by the battery management system 506.

The thermistors 518, 520 may implement a redundancy scheme. For example, in an embodiment, the thermistors 518, 520 are each designated as prime or redundant. In a further embodiment, a 3-thermistor majority voting scheme is used for each of the thermistors 518, 520.

Prior to cold shadow operations and lunar night survival, the electronics 412, the avionics 405, and the heater elements 512, 514 are ON until the WEB 404 and the battery 448 reach a temperature close to their maximum allowable temperature. This may provide the best possible initial conditions by maximizing the time it takes for the rover to cool down, preserving energy in the battery 448 and, by extension, reducing the mass of the battery 448.

For lunar night survival, the mast 406 is then stowed to cover the WEB radiator 408. The mast 406 stows during lunar night with the mast and WEB radiators 410, 408 facing each other to eliminate their view factor to deep space.

For wake-up, because the battery 448 charging temperature is higher than for discharging, power (e.g., from solar panels on the rover) is redirected by the battery management system 506 to the battery heater 502 and the WEB heater 504 until the battery 448 reaches a minimum allowable charging temperature. In an example, the minimum allowable charging temperature of the battery 448 is 0° C.

Figure 6:
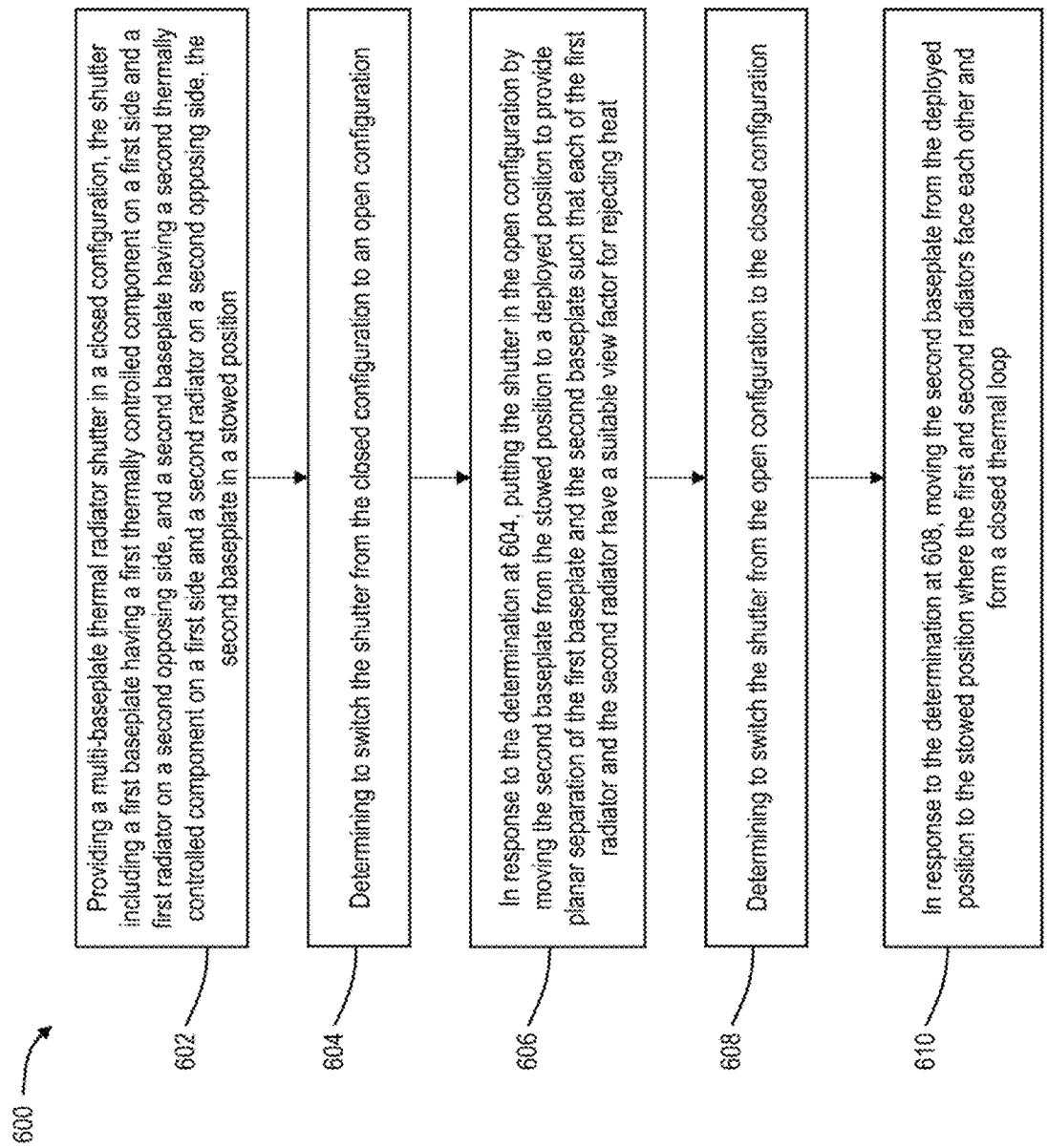
FIG. 6 is a flow diagram of a method of operating a thermal control system, such as the thermal control system of FIGS. 1A-1B, according to an embodiment.

Referring now to FIG. 6, shown therein is a method 600 of operating a thermal radiator shutter, according to an embodiment. The method 600 may be used, for example, to operate the thermal radiator shutters of FIGS. 1-4.

At 602, the method 600 includes providing a thermal radiator shutter in a closed configuration. The thermal radiator shutter includes a first baseplate having a first thermally controlled component on a first side and a first radiator on a second opposing side. The thermal radiator shutter further includes a second baseplate having a second thermally controlled component on a first side and a second radiator on a second opposing side. The second baseplate is in a stowed position relative to the first baseplate. In the stowed position, the second baseplate may be substantially parallel to the first baseplate. The stowed position may be considered a closed configuration.

In the closed configuration, the first and second radiators are thermally coupled such that the view factor of each radiator into deep space is blocked. Furthermore, because the first and second radiators are thermally coupled in the closed configuration, less or no heat may be rejected by the first or second radiators.

At 604, the method 600 includes determining to switch the thermal radiator shutter from the closed configuration to an open configuration.

In an embodiment, a human or other external operator sends a signal to the thermal radiator shutter to change configurations from the closed configuration to the open configuration, e.g., by typing a command, depressing a button, or clicking a computer peripheral at a location remote to the thermal radiator shutter.

In an embodiment, the determination whether to switch the thermal radiator shutter from the closed configuration to the open configuration is made based on received sensor data or signals collected by one or more sensors.

In an embodiment, the determination is made based on a clock or other timing mechanism.

Determining to switch the thermal radiator shutter from the closed configuration to the open configuration may include sensing a first condition, such as a first external environmental condition.

At 606, the method 600 includes, in response to the determination at 604, putting the thermal radiator shutter in the open configuration by moving the second baseplate relative to the first baseplate from the stowed position to a deployed position to provide planar separation of the first baseplate and the second baseplate, such that the first and second radiators can reject heat. In the deployed position, the second baseplate may be substantially perpendicular to the first baseplate. In other cases, the deployed position may have the second baseplate at any suitable angle relative to the first baseplate that provides suitable view factors for the respective radiators.

During day operations, the mast is deployed and the radiators have a view to deep space to reject the internal waste heat generated by the dissipating components.

At 608, the method 600 includes determining to switch the thermal radiator shutter from the open configuration to the closed configuration.

As at 604, in an embodiment, a human or other external operator sends a signal to the thermal radiator shutter to change configurations from the open configuration to the closed configuration, e.g., by typing a command, depressing a button, or clicking a computer peripheral at a location remote to the thermal radiator shutter.

As at 604, in an embodiment, the determination whether to switch the thermal radiator shutter from the open configuration to the closed configuration is made based on received sensor data or signals collected by one or more sensors.

As at 604, in an embodiment, the determination is made based on a clock or other timing mechanism.

As at 604, determining to switch the thermal radiator shutter from the open configuration to the closed configuration may include sensing a second condition, such as a second external environmental condition.

At 610, the method 600 includes, in response to the determination at 608, putting the thermal radiator shutter into the closed configuration by moving the second baseplate relative to the first baseplate from the deployed position to the stowed position to bring the first and second radiators into position to form a closed thermal loop.

Forming a thermally closed loop may include providing radiative coupling between the first and second radiators such that the view factors of the first radiator and the second radiator are eliminated.

Figure 7:
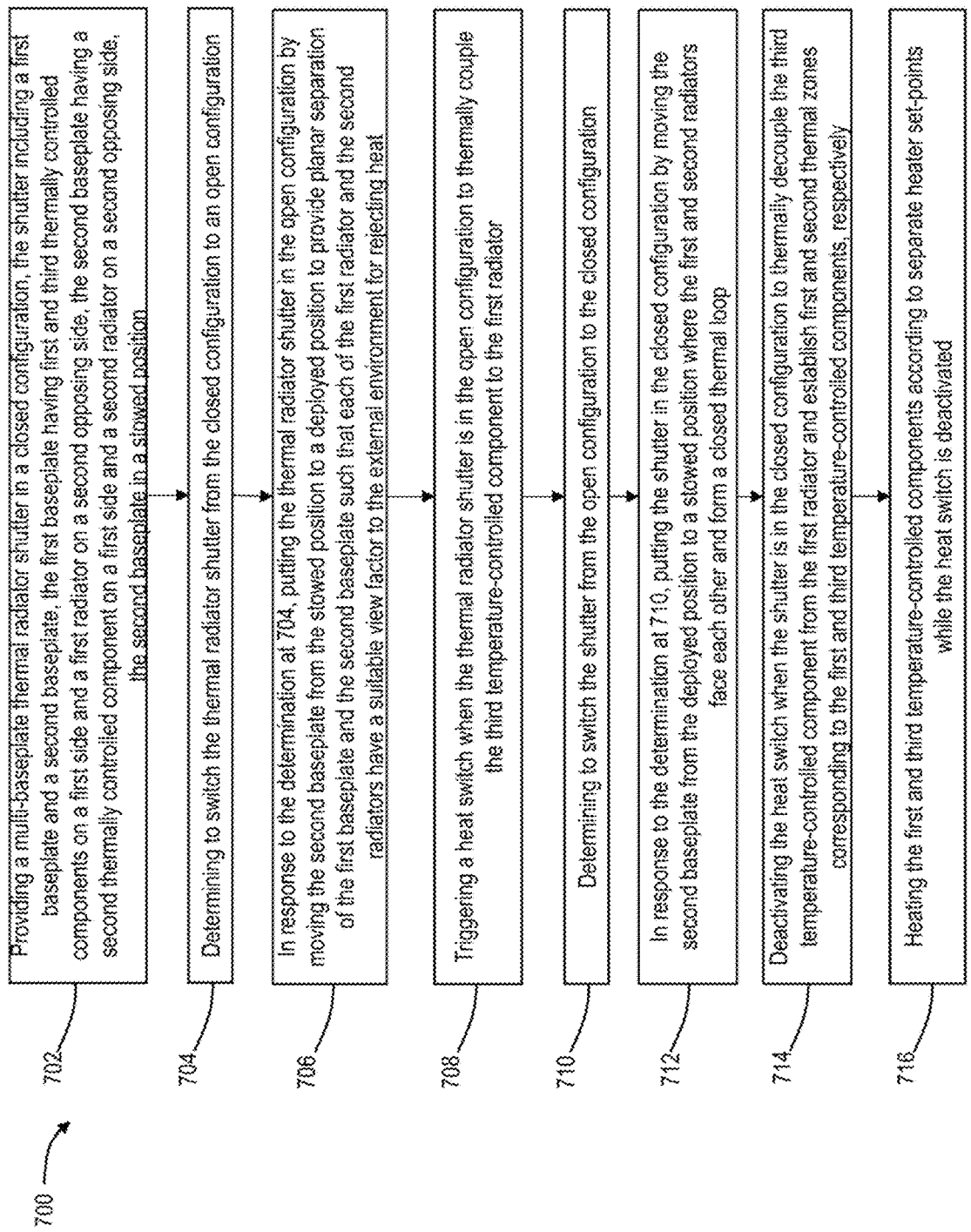
FIG. 7 is a flow diagram of a method of operating a thermal control system having multiple thermal zones on a single baseplate, such as the thermal control system of FIGS. 2A-2B, according to an embodiment.

Referring now to FIG. 7, shown therein is a method 700 of operating a thermal radiator shutter implementing multiple thermal control zones on a single baseplate, according to an embodiment. The method 700 may be used, for example, to operate the thermal radiator shutter 200 of FIGS. 2A-2B or the thermal radiator shutter 400 of FIGS. 4A-4B.

At 702, the method 700 includes providing a thermal radiator shutter in a closed configuration. The thermal radiator shutter includes a first baseplate having first and third thermally controlled components on a first side and a first radiator on a second opposing side. The thermal radiator shutter further includes a second baseplate having a second thermally controlled component on a first side and a second radiator on a second opposing side. In the closed configuration, the second baseplate is in a stowed position. The third temperature-controlled component is thermally insulated from the surrounding environment, including from the first temperature-controlled component. Such thermal isolation may be achieved, for example, by enclosing the third temperature-controlled component in thermal insulation material (e.g. multi-layer insulation, thermal blanket).

At 704, the method 700 includes determining to switch the thermal radiator shutter from the closed configuration to an open configuration.

The determination made at 704 may be made according to any of the embodiments described with respect to 604 in the method 600 of FIG. 6.

At 706, the method 700 includes, in response to the determination at 704, putting the thermal radiator shutter in the open configuration by moving the second baseplate from the stowed position to a deployed position to provide planar separation of the first and second baseplates such that each of the first and second radiators have a suitable view factor to the external environment for emitting or rejecting heat.

At 708, the method 700 includes triggering a heat switch when the thermal radiator shutter is in the open configuration to thermally couple the third temperature-controlled component to the first radiator.

When the heat switch is activated and the external temperature is above a predetermined minimum temperature (for example, a freezing point associated with a phase-change material forming at least part of the heat switch), the heat switch does not impede thermal communication between the third temperature-controlled component and the first radiator. Specifically, the heat switch does not impede communication between the third temperature-controlled component and a portion of the first baseplate to which the third temperature-controlled component is mounted, the first radiator at all times being in thermal communication with the first baseplate.

When the external temperature falls below the predetermined minimum temperature (for example, below the freezing point of the phase-change material), the heat switch does impede the foregoing thermal communication (e.g., because the phase-change material is a solid, heat in the third temperature-controlled component may not be transmitted to the first radiator via the first baseplate). Accordingly, the heat switch permits the third temperature-controlled component to receive heat from the first radiator when the external temperature is above the minimum temperature. The heat switch further prevents the third temperature-controlled component from transmitting heat to the first radiator when the external temperature is below the minimum temperature.

In the embodiment where the heat switch includes a phase-change material, activating the heat switch includes causing the phase-change material to melt. Activating the heat switch may be understood as referring to the phase-change material passively melting due to the external temperature.

At 710, the method 700 includes determining to switch the thermal radiator shutter from the open configuration to the closed configuration.

The determination made at 710 may be made according to any of the embodiments described with respect to 608 in the method 600 of FIG. 6.

At 712, the method 700 includes, in response to the determination at 710, putting the thermal radiator shutter in the closed configuration by moving the second baseplate from the deployed position to a stowed position where the first and second radiators face each other and form a closed thermal loop.

At 714, the method 700 includes deactivating the heat switch when the thermal radiator shutter is in the closed configuration to thermally decouple the third temperature-controlled component from the first radiator and establish first and second thermal zones. The first and second thermal zones are independent and correspond to the first and third temperature-controlled components, respectively.

In the embodiment where the heat switch includes a phase-change material, activating the heat switch includes causing the phase-change material to melt. Deactivating the heat switch may be understood as referring to the phase-change material passively freezing or solidifying due to the external temperature.

At 716, the method 700 includes heating the first and third temperature-controlled components according to separate heater set-points while the heat switch is deactivated. The second temperature-controlled component is at the same temperature as the first temperature-controlled component.

Figure 8:
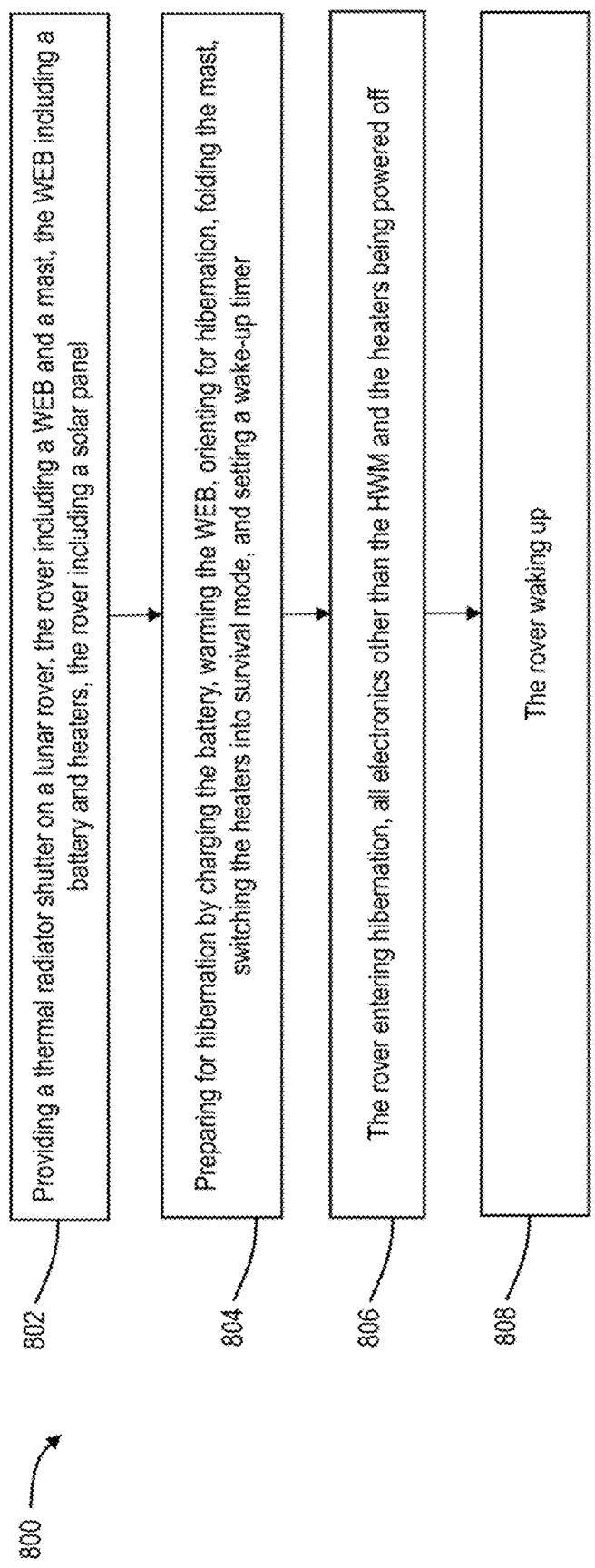
FIG. 8 is a flow diagram of a method of operating a thermal radiator shutter for lunar night survival, according to an embodiment.

Referring now to FIG. 8, shown therein is a method 800 of operating a thermal radiator shutter on a lunar rover for lunar night survival, according to an embodiment. The thermal radiator shutter may be the dual-baseplate shutter 100 of FIGS. 1A-1B, the dual-baseplate shutter 200 of FIGS. 2A-2B, the multi (tri)-baseplate thermal radiator shutter 300 of FIGS. 3A-3B, or the lunar rover thermal control system 400 of FIGS. 4A-4B.

At 802, the method 800 includes providing the thermal radiator shutter on the lunar rover, the shutter including a WEB and a mast, the WEB including a battery and survival heaters, the rover including a solar panel.

At 804, the method 800 includes preparing for hibernation. In order to prepare for hibernation, the rover fully charges the battery. The rover further warms up the WEB. The rover orients itself for hibernation. The rover folds in the mast. The rover initiates a power down sequence while switching the heaters into survival mode and setting a wake-up timer using a hibernation and wake up module ("HWM"). The HWM and heaters are powered directly from the battery. In an embodiment, the HWM and the heaters are the only components that stay powered during hibernation. Ground operators may command a power control unit ("PCU") into an off state, turning off an on-board computer/telecommunications module ("OBC"/"TCM") and transceiver so that the battery is only powering the HWM and the survival heaters. In an embodiment, preparing for hibernation may be performed via a single ground command that runs a "prepare-to-hibernate" function on the OBC that executes the foregoing operations in a sequence.

At 806, the method 800 includes the rover entering hibernation, all electronics other than the HWM and the heaters being powered off. The heaters are powered from the battery via the HWM and provide the necessary heat to maintain components within their survival temperature limits. No commands are sent to the rover during hibernation, and the rover takes no automatic actions. The temperature of the rover drops to cold survival (non-operational) levels.

At 808, the method 800 includes the rover waking up. Given that the main rover systems are off during hibernation, the operators cannot communicate with the rover to turn the rover back on. The rover uses the HWM to set the survival heaters to the operational temperature setpoint (e.g., −20° C.) and warm up the WEB and battery when the sun rises and the wake up timer has elapsed. When the rover is initially waking up, the heaters are powered directly from the solar panels via the HWM, because the battery is almost drained, and the external environment is too cold to start charging the battery. Once the WEB and battery reach their minimal operational/charge temperatures (e.g., −20° C.), the HWM turns on the PCU and starts running the survival heaters from the battery. The mast is raised, either via an autonomous HWM or PCU command. As the battery charges, voltage thereof exceeds the PCU load shed level, at which point the PCU automatically turns on the OBC/TCM and the communications subsystem. At this point, ground operators may establish communication with the rover. The ground operators may take over and command a sequence of checkouts to ensure rover health and functionality and prepare for the daytime operations.

Figure 9:
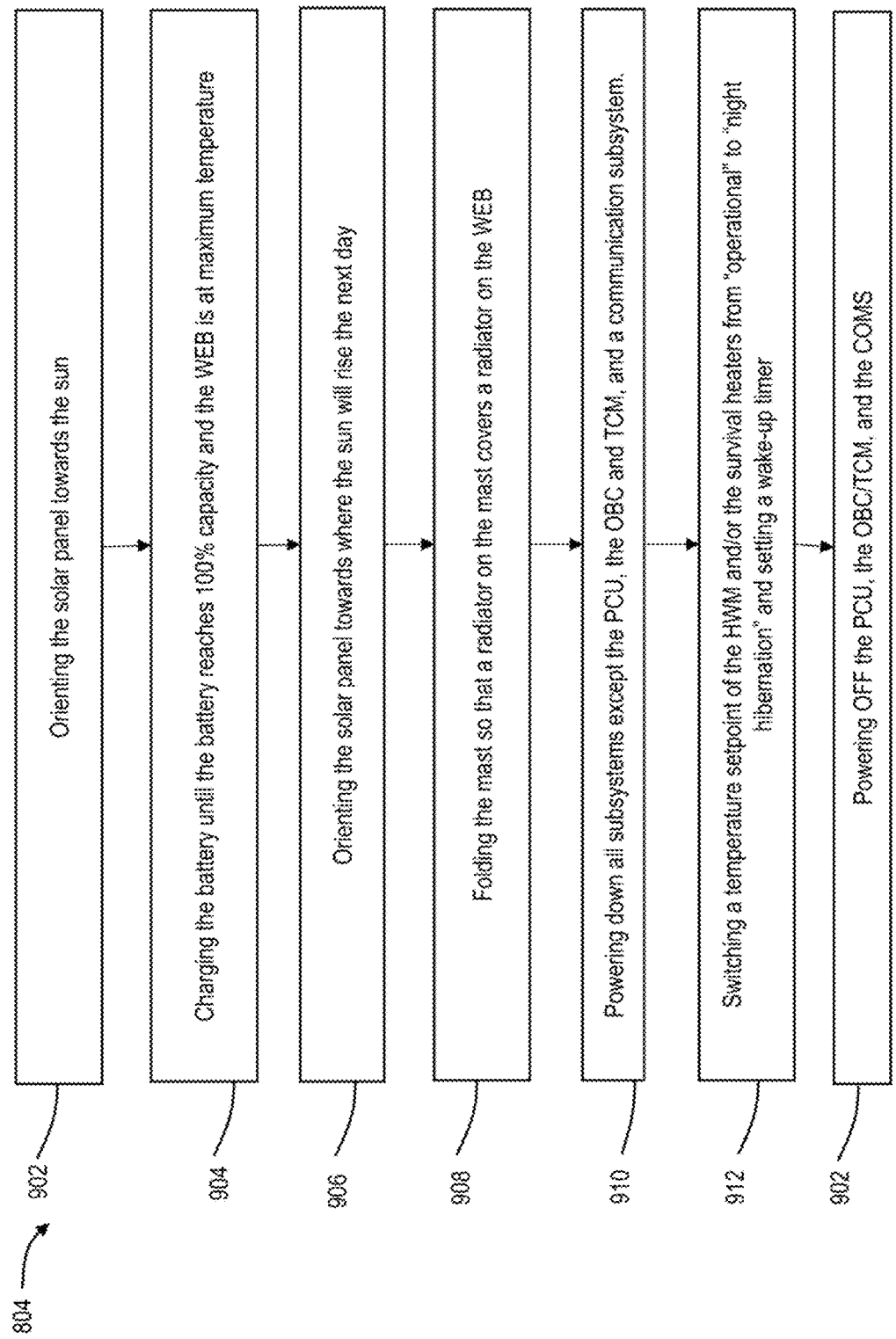
FIG. 9 is a flow diagram of an operation of preparing for hibernation in the method of FIG. 8, according to an embodiment.

Referring now to FIG. 9, shown therein is the operation 804 of preparing for hibernation in the method 800 for operating the thermal radiator shutter on the lunar rover for lunar night survival in greater detail, according to an embodiment.

At 902, the operation 804 includes orienting the solar panel towards the sun.

At 904, the operation 804 includes charging the battery until the battery reaches 100% capacity and the WEB is at maximum temperature.

At 906, the operation 804 includes orienting the solar panel towards where the sun will rise the next day.

At 908, the operation 804 includes folding the mast so that a radiator on the mast covers a radiator on the WEB.

At 910, the operation 804 includes powering down all subsystems except the PCU, the OBC and TCM, and a communication subsystem ("COMS").

At 912, the operation 804 includes switching a temperature setpoint of the HWM and/or the survival heaters from "operational" to "night hibernation" and setting a wake-up timer. Three pre-set combinations available.

At 914, the operation 804 includes powering OFF the PCU, OBC/TCM and COMS.

Figure 10:
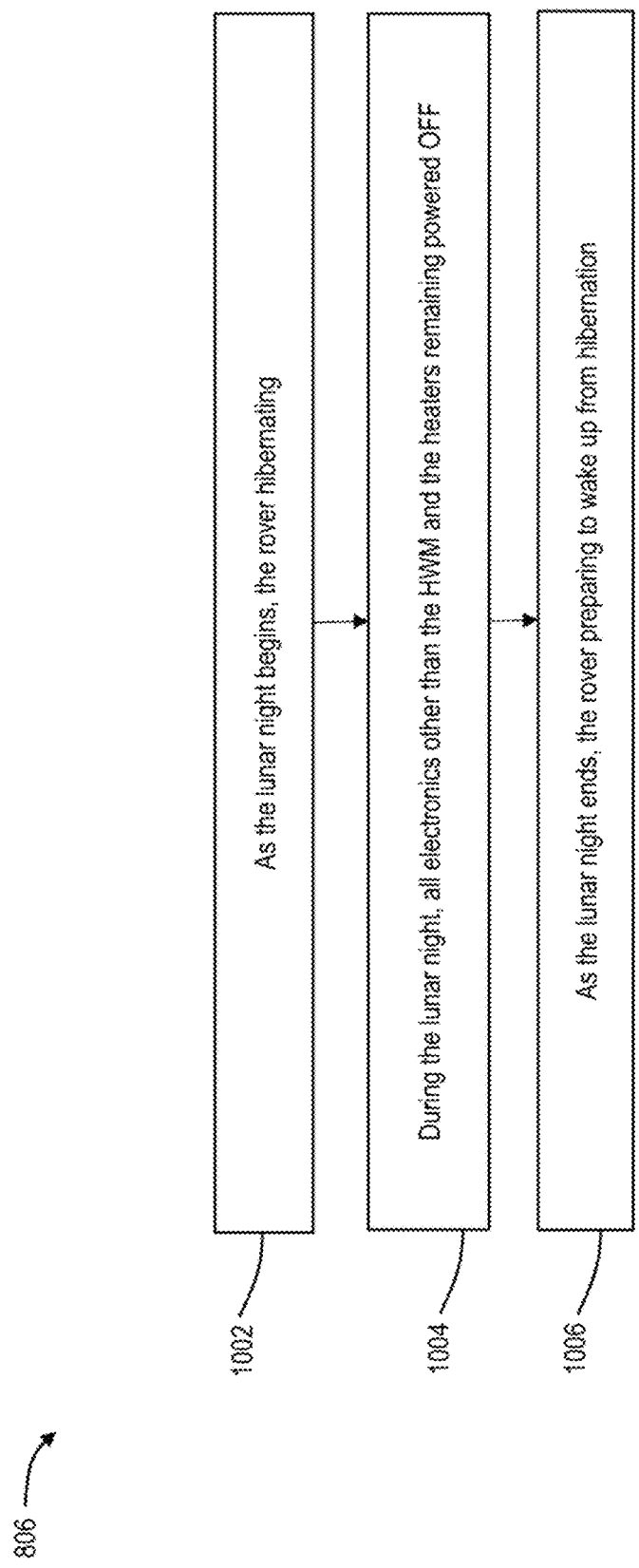
FIG. 10 is a flow diagram of an operation of a rover entering hibernation in the method of FIG. 8, according to an embodiment.

Referring now to FIG. 10, shown therein is the operation 806 of the rover entering hibernation in the method 800 for operating the thermal radiator shutter on the lunar rover for lunar night survival in greater detail, according to an embodiment.

At 1002, the operation 806 includes, as the lunar night begins, the rover hibernating.

At 1004, the operation 806 includes, during the lunar night, all electronics other than the HWM and the heaters remaining powered OFF.

At 1006, the operation 806 includes, as the lunar night ends, the rover preparing to wake up from hibernation.

Figure 11:
FIG. 11 is a flow diagram of an operation of the rover waking up in the method of FIG. 8, according to an embodiment.

Referring now to FIG. 11, shown therein is the operation 808 of the rover waking up in the method 800 for operating the thermal radiator shutter on the lunar rover for lunar night survival in greater detail, according to an embodiment.

At 1102, the operation 808 includes detecting sunrise by the HWM via the solar panel and the wake up timer expiring.

At 1104, the operation 808 includes the HWM switching the temperature setpoint of the heaters from "night hibernation" to "operational" to warm up the WEB and the battery using solar energy.

At 1106, the operation 808 includes, when the WEB and/or battery have reached operational temperature and the battery is charging, the HWM powering up the PCU.

At 1108, the operation 808 includes deploying the mast via an automatic PCU/HWM command.

At 1110, the operation 808 includes powering up the OBC/TCM and COMS when a voltage of the battery exceeds a load shed threshold of the PCU.

At 1112, the operation 808 includes establishing communications with the rover.

At 1114, the operation 808 includes, when the battery is fully recharged, performing a basic health check on the rover, the guidance and navigation control ("GNC") computer, the sensors, and a science instrument.

At 1116, the operation 808 includes, when the battery is fully recharged, performing a partial GNC checkout, a mobility checkout, a mast actuator checkout, a mast camera checkout, a science instrument checkout, and a final GNC and mobility checkout. The partial GNC checkout may be a checkout of a pre-vision system of the rover. The mobility checkout may be performed through small, back-and-forth motions of drive motors of the rover. The mast actuator mechanism may be performed through small, back-and-forth motions of pan and tilt motors of the mast.

At 1118, the operation 808 includes performing calibration of the stereo camera.

At 1120, the operation 808 includes determining that the battery is fully charged.

Figure 12:
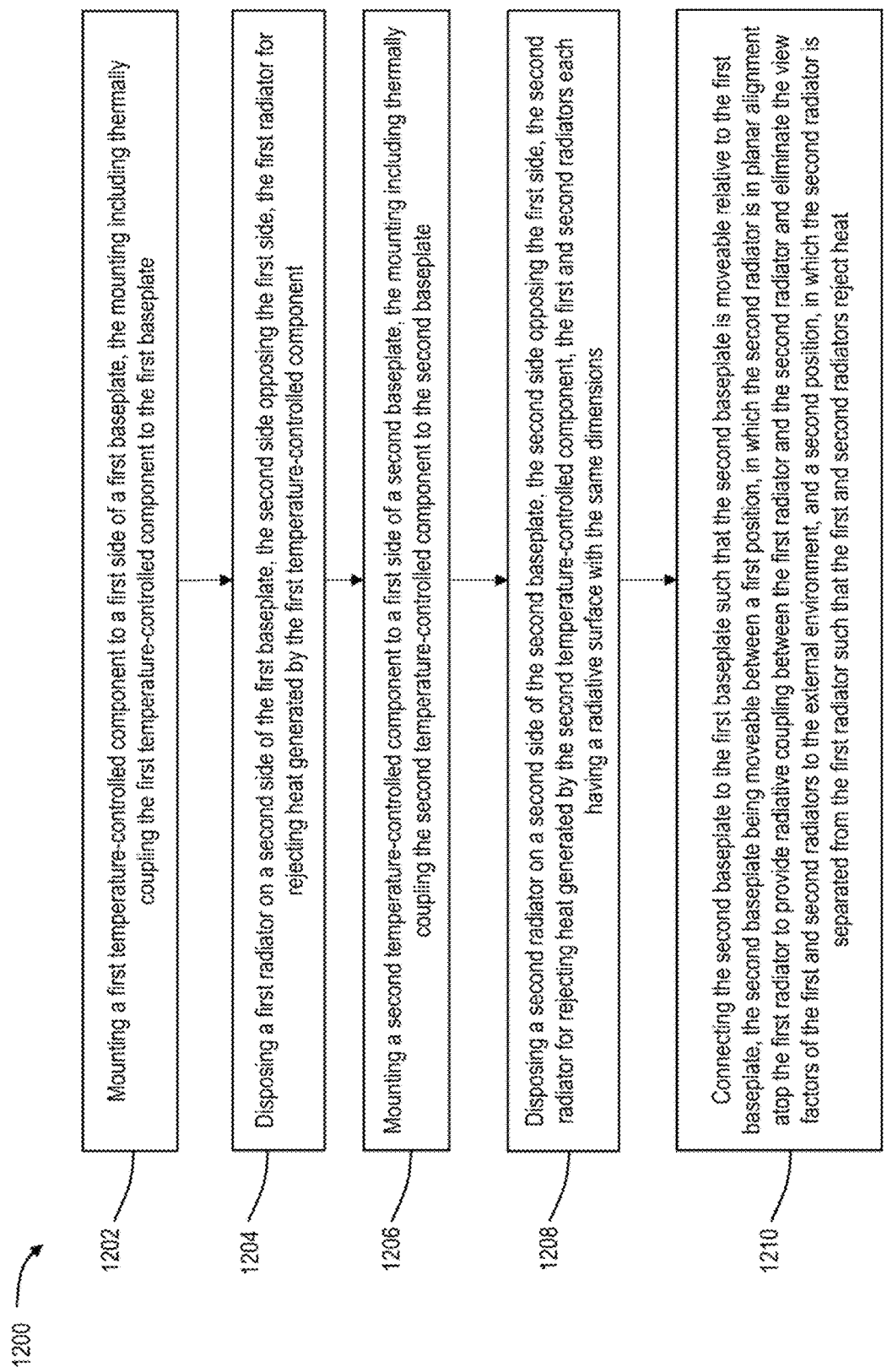
FIG. 12 is a flow diagram of a method of manufacturing a thermal control system, such as the thermal control system of FIGS. 1A-1B, according to an embodiment.

Referring now to FIG. 12, shown therein is a method 1200 of manufacturing a thermal radiator shutter, according to an embodiment. The method 1200 may be used, for example, to manufacture the thermal radiator shutters of FIGS. 1-4.

At 1202, the method 1200 includes mounting a first temperature-controlled component to a first side of a first baseplate. The mounting includes thermally coupling the first temperature-controlled component to the first baseplate.

At 1204, the method 1200 includes disposing a first radiator on a second side of the first baseplate, the second side opposing the first side. The first radiator is for rejecting heat generated by the first temperature-controlled component. The first radiator includes a radiative surface having first dimensions. Disposing the first radiator on the second side of the first baseplate may include coating an area of the second side of the first baseplate with high-emissivity paint and not covering the area with insulation so as to provide the first radiator on the second side of the first baseplate.

At 1206, the method 1200 includes mounting a second temperature-controlled component to a first side of a second baseplate. The mounting includes thermally coupling the second temperature-controlled component to the second baseplate.

At 1208, the method 1200 includes disposing a second radiator on a second side of the second baseplate, the second side opposing the first side. The second radiator is for rejecting heat generated by the second temperature-controlled component. The second radiator includes a radiative surface having second dimensions. The second dimensions of the radiative surface area of the second radiator and the first dimensions of the radiative surface area of the first radiator are the same.

At 1210, the method 1200 includes connecting the second baseplate to the first baseplate such that the second baseplate is moveable relative to the first baseplate. The second baseplate is connected such that it is moveable between a first position, in which the radiative surface of the second radiator is substantially parallel to the radiative surface of the first radiator and close enough to provide radiative coupling between the first and second radiators and eliminate the view factors of the first and second radiators to the external environment, and a second position, in which the second radiator is separated from the first radiator such that the first and second radiators have a suitable view factor to the environment for rejecting heat. Such heat may be generated by the first and second temperature-controlled components. Such heat may be generated by heaters mounted on either baseplate.

In an embodiment, a first, fixed end of the second baseplate is connected to the first baseplate and acts generally as a pivot point of the second baseplate. A second, longitudinally opposed end of the second baseplate is not connected to the first baseplate and may be considered a "free end". When moving between an open and closed configuration, the free end of the second baseplate travels an arcuate path, while the first end remains fixed. For example, the second baseplate may be connected in such a way that the second baseplate can move between a position in which the second baseplate is substantially parallel to and atop the first baseplate and a position in which the second baseplate is not substantially parallel to and atop the first baseplate, e.g., where the second baseplate is substantially parallel to but not atop the first baseplate, where the second baseplate is substantially perpendicular to the first baseplate.

In an embodiment, the second baseplate is mounted on a deployable vehicle mast (e.g., a rover mast). The mast is mounted on a vehicle platform that includes a WEB. The mast is a separate subsystem for deploying the GN&C sensors for vehicle navigation. In the open configuration, the vehicle is operational and the WEB and mast perform their respective tasks using components mounted thereto or therein. When the vehicle goes into survival mode, the mast is stowed, and in doing so the mast covers the WEB radiator with the mast radiator.

In some embodiments, the second baseplate may be coupled to the first baseplate in a manner that prevents movement of the second baseplate beyond the deployed/open position (e.g., mechanically prevented). In other embodiments, the coupling may be such that the second baseplate can move beyond the deployed/open position but is generally prevented from doing so by a control mechanism or the like.

In an embodiment, the method 1200 further includes providing for planar separation of a first thermal control zone on the first baseplate and a second thermal control zone on the second baseplate, the thermal control zones being independent of one another.

In an embodiment, the method 1200 further includes connecting an actuator to at least the second baseplate, the actuator for moving the second baseplate between the first position and the second position when the second baseplate is connected to the first baseplate.

In an embodiment, the method 900 further includes covering dissipating, non-radiative components of the first baseplate and the second baseplate with multi-layer thermal insulation to minimize radiative losses. Such covering does not extend to any predetermined apertures of the first baseplate and the second baseplate. Such covering does not extend to the radiators. Such covering may fully cover the first baseplate and the second baseplate except for the predetermined apertures and the radiators.

The method 900 may further include disposing thermal filler between each of the first and second baseplates and any components mounted thereto within the independent thermal control zones.

The method 900 may further include mounting a third component to the first baseplate and disposing a heat switch between the third component and the first baseplate. The heat switch may provide a third thermal control zone independent of the other thermal control zones. The third component may be covered with the multi-layer thermal insulation. The third component may be a battery.

The method 900 may include providing heaters to maintain a minimum allowable temperature of the third component in the third thermal control zone. Thermistors may be further provided to determine a temperature of the third component in the third thermal control zone.

While the above description provides examples of one or more apparatus, methods, or systems, it will be appreciated that other apparatus, methods, or systems may be within the scope of the claims as interpreted by one of skill in the art.

The invention claimed is:

1. A thermal radiator shutter for active thermal control of a system, the thermal radiator shutter comprising:

a first baseplate having a first temperature-controlled component mounted on a bottom side of the first baseplate and a first radiator disposed on a top side of the first baseplate;

a second baseplate having a second temperature-controlled component mounted on a first side of the second baseplate and a second radiator disposed on a second side of the second baseplate opposing the first side, the second baseplate being moveable between a closed position and an open position; and an actuator connected to the second baseplate for moving the second baseplate from the closed position to the open position and from the open position to the closed position;

wherein when the second baseplate is in the closed position the second radiator faces the first radiator to provide radiative coupling, creating a thermal loop where heat flows between the first and the second baseplates; and wherein when the second baseplate is in the open position the first and the second baseplates are separated such that (i) the first and the second radiators have a greater view factor to a surrounding environment than in the closed position for rejecting heat from the first and the second temperature-controlled components, respectively, and (ii) the first and the second radiators have a reduced view factor to each other compared to the closed position.

2. The thermal radiator shutter of claim 1, wherein when the second baseplate is in the closed position each of the first and the second radiators have a 0% view factor to the surrounding environment.

3. The thermal radiator shutter of claim 1, wherein when the second baseplate is in the closed position the first and the second radiators are in full thermal communication with each other.

4. The thermal radiator shutter of claim 1, wherein when the second baseplate is in the closed position the first and the second radiators do not make physical contact with each other, and the system further comprises an insulative material covering an edge where the first and the second radiators come together to reduce heat leakage from the edge.

5. The thermal radiator shutter of claim 1, further comprising an insulative material applied to each surface of the first and the second baseplates that is exposed to the surrounding environment when the second baseplate is in either the open or the closed position.

6. The thermal radiator shutter of claim 1, wherein the first and the second radiators have first and second radiative surfaces, respectively, that are equal in size.

7. The thermal radiator shutter of claim 1, wherein the first and the second radiators have respective sizes and geometries that allow them to act as radiators when the second baseplate is in the open position and act as view blockers to the other radiator when the second baseplate is in the closed position, wherein the first and the second radiators have view factors of at least 80% to the surrounding environment when the second baseplate is in the open position, and wherein the first and the second radiators have view factors of at most 20% to the surrounding environment when the second baseplate is in the closed position.

8. The thermal radiator shutter of claim 1, wherein at least one of the first radiator and the second radiator is a separate piece of material from the first or the second baseplate, respectively.

9. The thermal radiator shutter of claim 1, wherein the first baseplate is covered in an insulative material and the first radiator is a portion of the first baseplate that is not covered by the insulative material, or wherein the second baseplate is covered in an insulative material and the second radiator is a portion of the second baseplate that is not covered by the insulative material.

10. The thermal radiator shutter of claim 1, wherein the first radiator or the second radiator is coated with an optical coating having an absorptance-to-emittance ratio in the range of 0.1 to 0.3.

11. The thermal radiator shutter of claim 10, wherein the optical coating is a white paint or a reflective tape.

12. The thermal radiator shutter of claim 1, wherein the actuator comprises a hinge mechanism, and wherein the second baseplate moves between the open and the closed positions via the hinge mechanism.

13. The thermal radiator shutter of claim 1, wherein the movement of the second baseplate from the open position to the closed position or from the closed position to the open position is performed automatically based on detection of an environmental condition of the surrounding environment.

14. The thermal radiator shutter of claim 1, further comprising a third temperature-controlled component mounted to the first side of the first baseplate and a heat switch disposed between the third temperature-controlled component and the first side of the first baseplate, the heat switch for regulating or controlling thermal coupling or conductance between the third temperature-controlled component and the first baseplate.

15. The thermal radiator shutter of claim 14, wherein the third temperature-controlled component is enclosed or covered in a layer of thermal insulation.

16. The thermal radiator shutter of claim 1, further comprising:

a third baseplate having a third temperature-controlled component mounted on a first side of the third baseplate and a third radiator disposed on a second side of the third baseplate opposing the first side, the third baseplate being moveable between a second closed position and a second open position:

a fourth radiator disposed on the second side of the first baseplate;

a second actuator for moving the third baseplate between the second open and the second closed positions; and wherein when the third baseplate is in the second open position the first and third baseplates are separated such that the third and the fourth radiators have a greater view factor to a surrounding environment than in the second closed position for rejecting heat from the first and the third temperature-controlled components, respectively, and the third and the fourth radiators have a reduced view factor to each other compared to the second closed position.

17. The thermal radiator shutter of claim 1, wherein the thermal radiator shutter is implemented as part of a robotic system, and wherein the actuator is an extant actuator system of the robotic system.

18. The thermal radiator shutter of claim 17, wherein the robotic system is a space rover comprising a mast boom controlled by the extant actuator system, wherein the second baseplate is on the mast boom and the first baseplate is on a platform of the space rover to which the mast boom is connected, and wherein the second baseplate is deployed via the mast boom.

19. A method of providing thermal control via a thermal radiator shutter, the method comprising:

providing a thermal radiator shutter in a closed configuration, the thermal radiator shutter including a first baseplate having a first thermally controlled component on a first side and a first radiator on a second opposing side, and a second baseplate having a second thermally controlled component on a first side and a second radiator on a second opposing side, the second baseplate in a stowed position, the first and the second radiators being equal in size;

determining to switch the thermal radiator shutter from the closed configuration to an open configuration;

in response to the determination to switch the thermal radiator shutter from the closed configuration to the open configuration, putting the thermal radiator shutter in the open configuration by moving the second baseplate from the stowed position to a deployed position to provide planar separation of the first baseplate and the second baseplate such that each of the first radiator and the second radiators have a suitable view factor for emitting or rejecting heat;

determining to switch the thermal radiator shutter from the open configuration to the closed configuration; and in response to the determination to switch the thermal radiator shutter from the open configuration to the closed configuration, moving the second baseplate from the deployed position to the stowed position where the first and the second radiators face each other and form a closed thermal loop.

20. A method of manufacturing a thermal radiator shutter for providing active thermal control, the method comprising:

mounting a first temperature-controlled component to a first side of a first baseplate, the mounting including thermally coupling the first temperature-controlled component to the first baseplate;

disposing a first radiator on a second side of the first baseplate, the second side opposing the first side, the first radiator for rejecting heat generated by the first temperature-controlled component;

mounting a second temperature-controlled component to a first side of a second baseplate, the mounting including thermally coupling the second temperature-controlled component to the second baseplate;

disposing a second radiator on a second side of the second baseplate, the second side opposing the first side, the second radiator for rejecting heat generated by the second thermally-controlled component, the first and the second radiators each having a radiative surface with the same dimensions; and connecting the second baseplate to the first baseplate such that the second baseplate is moveable relative to the first baseplate, the second baseplate being moveable between a first position, in which the second radiator is in planar alignment with the first radiator to provide radiative coupling between the first radiator and the second radiator and eliminate the view factors of the first and the second radiators, and a second position, in which the second radiator is separated from the first radiator such that the first and the second radiators reject heat generated by the first and the second temperature-controlled components, respectively.

* * * * *